US010692290B2

(12) United States Patent
Estable

(10) Patent No.: US 10,692,290 B2
(45) Date of Patent: Jun. 23, 2020

(54) AUGMENTED REALITY VIDEO COMMUNICATIONS

(71) Applicant: TREMOLANT INC., Gatineau (CA)

(72) Inventor: Luis Pablo Estable, Gatineau (CA)

(73) Assignee: Tremolant Inc. (CA)

( * ) Notice: Subject to any disclaimer, the term of this patent is extended or adjusted under 35 U.S.C. 154(b) by 0 days.

(21) Appl. No.: 15/984,413

(22) Filed: May 20, 2018

(65) Prior Publication Data

US 2019/0066381 A1 Feb. 28, 2019

Related U.S. Application Data

(63) Continuation-in-part of application No. 15/304,103, filed on Oct. 14, 2016, now abandoned.

(51) Int. Cl.
*G06T 19/00* (2011.01)
*G02B 27/01* (2006.01)
*H04N 7/14* (2006.01)

(52) U.S. Cl.
CPC ........ *G06T 19/006* (2013.01); *G02B 27/0172* (2013.01); *H04N 7/142* (2013.01); *H04N 7/147* (2013.01); *G02B 2027/014* (2013.01); *G02B 2027/0138* (2013.01); *G02B 2027/0178* (2013.01); *G06T 2210/12* (2013.01); *G06T 2219/024* (2013.01)

(58) Field of Classification Search
CPC ............... G06T 19/006; G06T 2210/12; G06T 2219/024; G02B 27/0172; G02B 2027/0138; G02B 2027/014; G02B 2027/0178; G02B 2027/0134; H04N 7/142; H04N 7/147
See application file for complete search history.

(56) References Cited

U.S. PATENT DOCUMENTS

2012/0299961 A1 11/2012 Gurumurthy et al.
2017/0039774 A1 2/2017 Estable

FOREIGN PATENT DOCUMENTS

CA      2938895 A1    8/2015
WO  2015/157862 A1   10/2015

OTHER PUBLICATIONS https://web.archive.org/web/20140413125352/htps://www.spaceglasses.com/, Apr. 13, 2014.

(Continued)

*Primary Examiner* — Maurice L. McDowell, Jr.
(74) *Attorney, Agent, or Firm* — PatentAgency.ca; Luis Pablo Estable

(57) ABSTRACT

Disclosed herein are: methods of augmented reality video communications; camera system in data communication with a display system; data structures for camera field of view, camera frame buffer, a bounding box corresponding to a desired portion of the camera field of view, and a bounding box frame buffer; the bounding box data structure includes a portion of the camera frame buffer interpolated between the bounding box data structure and the camera field of view; the bounding box frame structure is sent to the display system; data structures for a display field of view, an augmented reality video overlay corresponding to a desired portion of the display field of view, and a display frame buffer; the display buffer includes a portion of a received display frame buffer interpolated between the augmented reality video overlay and the display field of view; the display buffer data structure is shown on the display.

13 Claims, 27 Drawing Sheets

(56) References Cited

OTHER PUBLICATIONS https://en.wikipedia.org/wiki/Data_structure, Jan. 15, 2016.
IPRP for the international phase of the parent application indicates claims of the parent application were novel, inventive, and had industrial applicability. See IPRP of PCT/CA2015/050310 in global dossier, Apr. 11, 2016.

AUGMENTED REALITY VIDEO COMMUNICATIONS

CROSS-REFERENCE TO RELAYED APPLICATIONS

The present application is related to and a continuation in part of U.S. non-provisional patent application, Ser. No. 15/304,103, filed Oct. 14, 2016, for AUGMENTED REALITY COMMUNICATIONS, by Luis Pablo Estable, included by reference herein and for which benefit of the priority date is hereby claimed.

TECHNICAL FIELD

The present application relates to augmented reality and, more particularly, to augmented reality communication techniques.

BACKGROUND OF THE APPLICATION

According to Wikipedia®, Augmented Reality (AR) is a live direct or indirect view of a physical, real-world environment whose elements are augmented (or supplemented) by computer-generated sensory input such as sound, video, graphics or GPS data. Hardware components for augmented reality are: processor, display, sensors and input devices. Modern mobile computing devices like smartphones and tablet computers contain these elements which often include a camera and MEMS sensors such as accelerometer, GPS, and solid state compass, making them suitable AR platforms.

AR displays can be rendered on devices resembling eyeglasses, hereinafter AR eye wear. Versions include eye wear that employ cameras to intercept the real world view and re-display its augmented view through the eye pieces and devices in which the AR imagery is projected through or reflected off the surfaces of the eye wear lens pieces. Google® Glass is not intended for an AR experience, but third-party developers are pushing the device toward a mainstream AR experience. After the debut of Google Glass® many other AR devices emerged such as but not limited to Vuzix® M100, Optinvent®, Meta Space Glasses, Telepathy®, Recon Jet®, Glass Up®, K-Glass, Moverio® BT-200, and Microsoft® Hololens®.

Some of the AR eye war offers the potential to replace other devices a user typically has to carry with them, such as for example, their mobile device (e.g. computer, tablet, smart phone, etc.). The Meta Space Glasses for example proposes to mirror devices in AR form such that they would appear in front of the wearer of the AR eye wear. Networked data communications enable the display of the user interface of the devices into 3D models of the device housings. Interaction between the AR form of the devices and the wearer of the AR eye wear is turned into user input which is relayed to the actual device via the networked data communications. Similarly, the result of any such interactions, or any updates of the user interface of the devices, is communicated to be rendered by the AR eye wear thereby enabling the AR form of the devices to look and operate substantially like the real devices. Advantageously, the devices themselves can remain in a secure location such that the wearer of the AR eye wear need only carry the AR eye wear and leave every other device behind AR eye wear therefore have the potential to become the ultimate in mobile technology as the user may be able to carry the AR eye wear and nothing else.

A problem that such an arrangement presents is that it is not possible to utilise the camera functionality of the AR form of devices having cameras integrated to them. For example, if a mobile device has a camera, the user of the same mobile device in AR form via their AR eye wear will not be able to use the front facing camera for such purposes as, for example video communication such as video conferencing or video chat: if the camera of the real device is enabled using a video conferencing or video chat application, the camera will be recording what it sees at the remote location, and not the location whereat the user of the AR form via their AR eye wear sees.

A possible solution to the problem of using AR eye wear for video communication is the employment of a separate physical camera in conjunction with the AR eye wear.

A possible solution to the problem of using AR eye wear for video communication is the use of the existing AR eye wear camera for video communication.

Using a separate physical camera in conjunction with an AR eye wear for video communication has the inconvenience of requiring one to carry an additional device that needs to be in communication with the AR eye wear.

Using the camera in the AR eye wear for video communication is promising, but it presents some additional challenges. For example, since these cameras face away from the wearer of the AR eye wear, the wearer may not be able to simultaneously view the user interface (including video communications from another party) at the same time as they capture their own image: currently the user of the AR eye wear would have to remove the AR eye wear to point the camera toward themselves in order to direct the camera to their own face for video communication. A similar problem occurs if users of an AR eye wear wishes to use a conventional video communications application such as Skype® or the like: the other party sees what the AR eye wear user is seeing, and not the AR eye wear user himself.

There is therefore a need for techniques of employing the camera functionality that is built in to the AR eye wear to enable the wearer to participate in video communication without the need of any additional communications to an additional external device with the AR eye wear, and without the need of removing the AR eye wear to direct the camera in the AR eye wear to their own face.

SUMMARY OF THE APPLICATION

According to one aspect of the present application, there is provided a method of augmented reality communications involving at least one ar-computer connected to ar-eyewear having an ar-camera and an ar-display. The method comprising the acts of: determining at least one data structure that delimits at least one portion of a field of view onto the surface of a mirror; if the at least one data structure includes an ar-bound-box, then selecting the ar-camera video using the ar-bound-box and sending a formatted-ar-camera-video using the ar-bound-box; and if the at least one data structure includes an ar-video-overlay, then receiving a received-video and displaying the received-video in the ar-video-overlay. Some embodiments further include pre-steps to one of the acts of sending or receiving, including at least one of signalling to establish a communications path between end points, configure ar-markers, configure facial recognition, configure camera calibration, and configure relative position of user interface elements. In some embodiments, the ar-bound-box delimits the portion of the field of view of the ar-camera that will be utilised to send the formatted-ar-camera-video. In some embodiments, the data structure is determined automatically by recognizing at the ar-computer using the ar-camera, one of: a reflection of the face of a user in a mirror, a reflection of the ar-eyewear in a mirror, and an ar-marker. In some embodiments, the data structure is determined manually by user manipulation of the information displayed in the ar-display including at least one of grab, point, pinch and swipe. Some embodiments, further include the step of formatting the ar-camera video including at least one of correcting for alignment of a mirror with the ar-camera and cropping the ar-camera video to include the portion that is delimited by the ar-bound-box. In some embodiments, at least a portion of the data-structure is positioned on the surface of a mirror. In some embodiments, the ar-video-overlay is dimensioned and positioned relative to a user of the ar-eyewear. Some embodiments further include post-steps to one of the acts of sending or receiving, including at least one of terminating the video communication, terminating the communication path between the end points, reclaiming resources, storing preferences based on one of location, ar-marker, data used, and ar-bound-box.

According to another aspect of the present application, there is provided an ar video communication system suitable for augmented reality communications over a data-communications-network. The system includes: an ar-eyewear including at least one ar-display, and at least one ar-camera; an ar-computer including at least an ar-video-communications-module and other-modules, the ar-computer connected with the ar-eyewear so as to enable the ar-video-communications-module and other modules to use the ar-display and the ar-camera. The ar-video-communications-module is configured for at least one of determining an ar-bound-box, selecting ar-camera video using an ar-bound-box, sending formatted-ar-camera-video, receiving video, determining an ar-video-overlay, and displaying video in an ar-video-overlay. In some embodiments, the ar-eyewear further comprises at least one of a frame, a second ar-display, a left lens, a right lens, a sound-sensor, a left speaker, a right speaker, and a motion sensor. In some embodiments, the ar-camera includes at least one of a camera and a depth-camera. In some embodiments, the ar-computer further comprises at least one of a CPU, a GPU, a RAM, a storage drive, and other modules. In some embodiments, the ar-video-communications-module provides a conventional camera device driver to enable applications operating in the ar-computer to use a mirror-camera as if it were a real-world camera.

According to another aspect of the present application, there is provided a method of augmented reality communications between a first system having at least one camera with a first field of view and a second system having at least one display with a second field of view, the first and second systems being in data communication with each other, the method comprising the steps of: providing a camera field of view data structure at the first system corresponding to the field of view of the at least one camera; providing a camera frame buffer data structure at the first system for receiving image data from the camera corresponding to what is visible in the field of view of the camera; providing a bounding box data structure at the first system corresponding to a desired portion of the camera field of view; providing a bounding box frame buffer data structure at the first system for receiving a portion of the image data in the camera frame buffer data structure; interpolating between the bounding box data structure and the camera field of view data structure to copy a portion of the camera frame buffer data structure into the bounding box frame buffer data structure; and sending the bounding box frame buffer data structure from the first system to the second system.

According to another aspect of the present application, there is provided a method of augmented reality communications between a first system having at least one camera with a first field of view and a second system having at least one display with a second field of view, the first and second systems being in data communication with each other, the method comprising the steps of: providing at least one display field of view data structure at the second system corresponding to the field of view of the at least one display; providing an augmented reality video overlay data structure at the second system corresponding to a desired portion of the at least one display field of view; receiving a bounding box frame buffer data structure from the first system at the second system; providing at least one display frame buffer data structure at the second system for receiving image to be displayed in a portion of the field of view of the at least one display; interpolating between the augmented reality video overlay data structure and the display field of view data structure to copy the received display frame buffer data structure to the at least one display buffer data structure; and displaying the at least one display buffer data structure on the at least one display.

Other aspects will be understood in view of the below description and accompanying drawings.

BRIEF DESCRIPTION OF THE DRAWINGS

A complete understanding of the present application may be obtained by reference to the accompanying drawings, when considered in conjunction with the subsequent, detailed description, in which.

For purposes of clarity and brevity, like elements and components will bear the same designations throughout the Figures.

DETAILED DESCRIPTION OF THE DRAWINGS

Figure 1A:
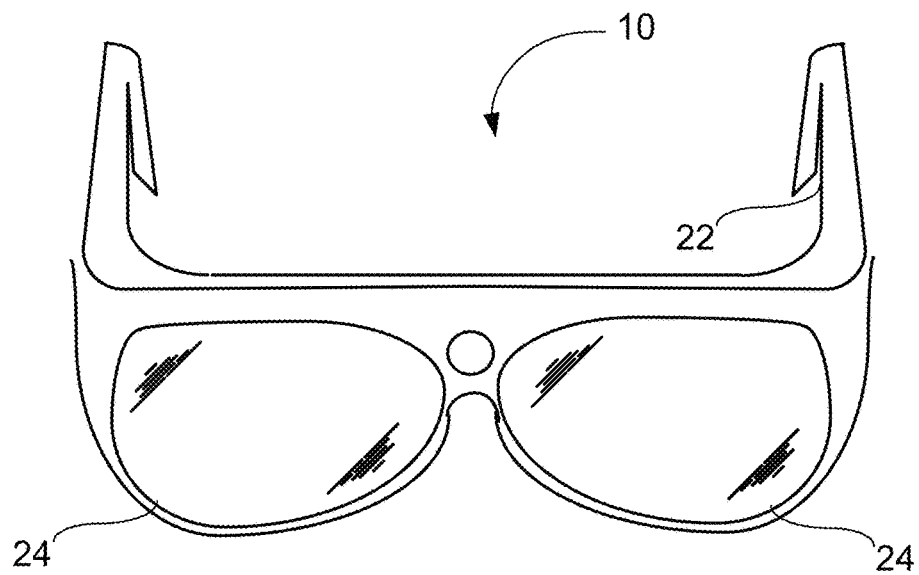
FIG. 1A is a front view of a prior-art AR eye wear.
Figure 1B:
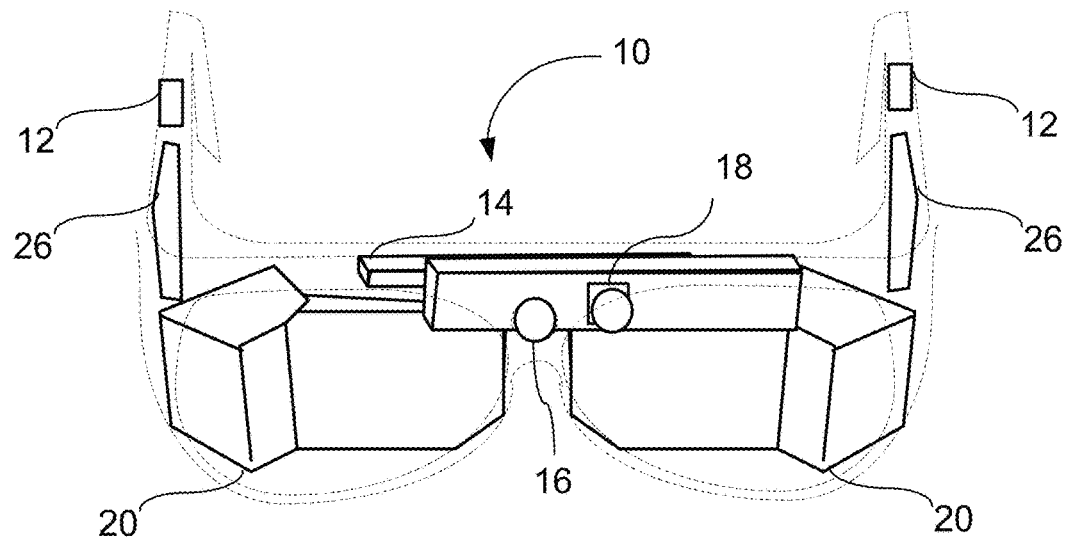
FIG. 1B is a view of components in the prior-art AR eye wear.
Figure 2:
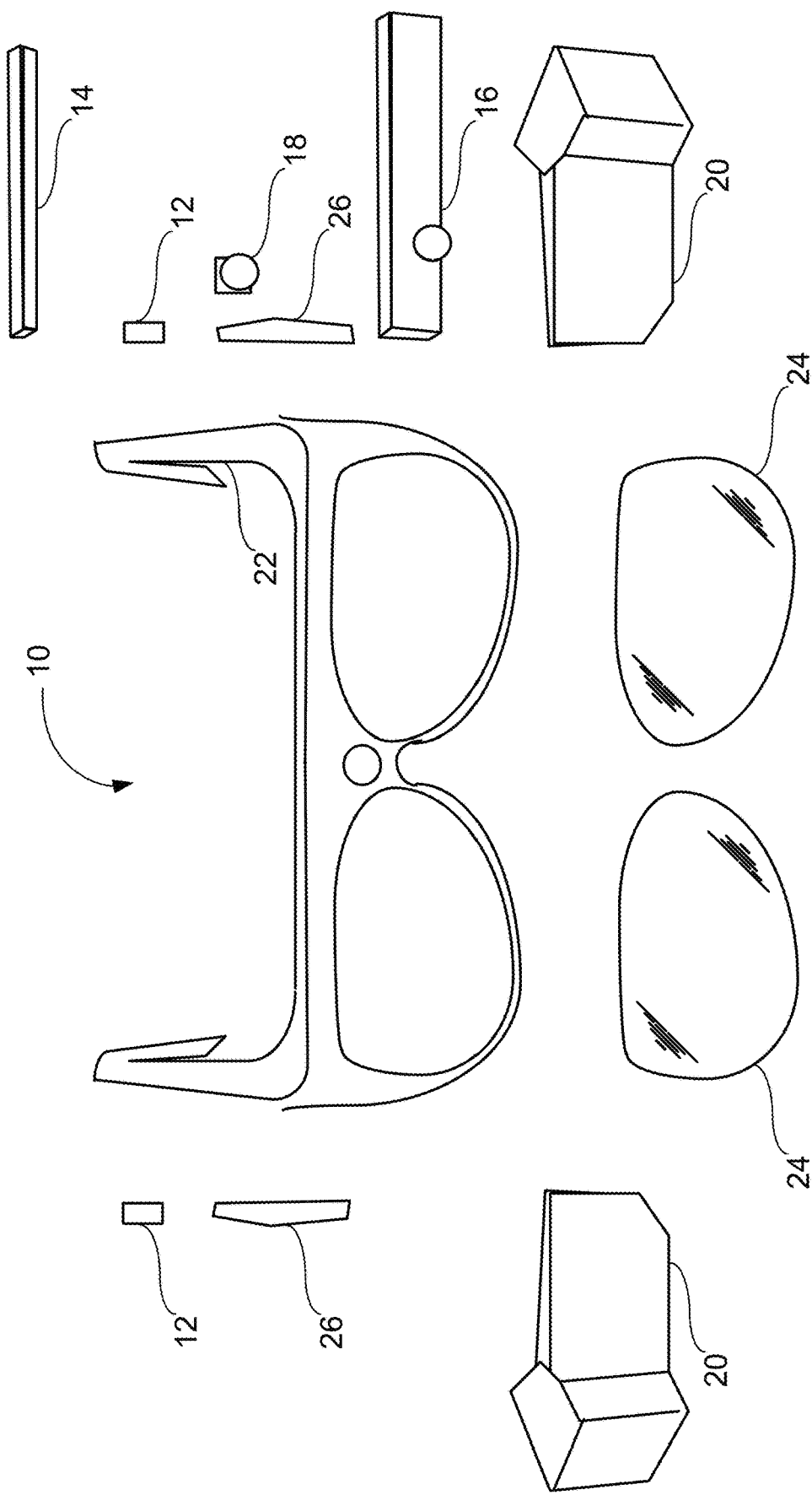
FIG. 2 is an exploded view of the prior art AR eye wear of FIG. 1.
Figure 3A:
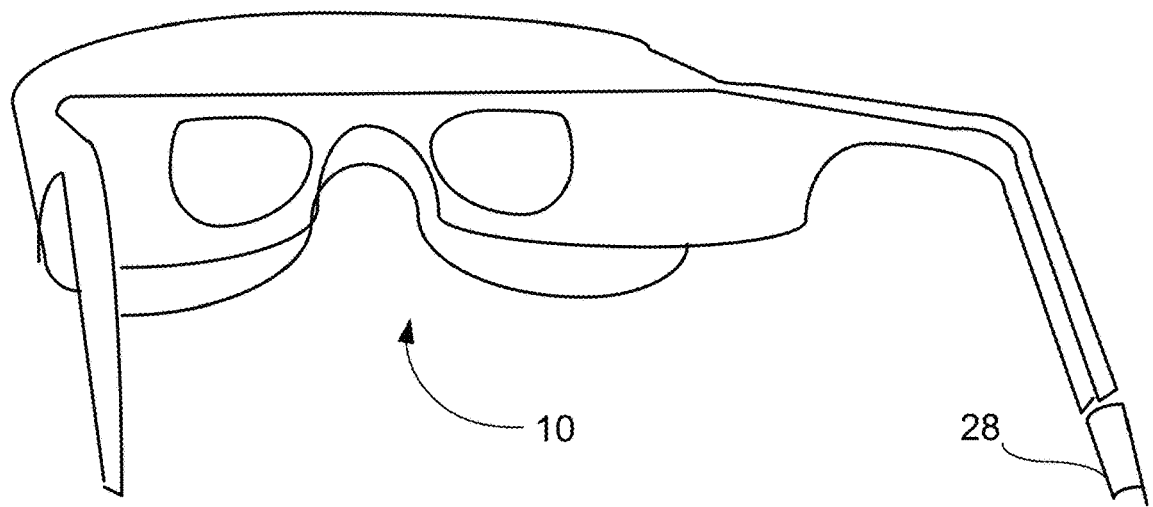
FIG. 3A is a rear view of the prior art AR eye wear of FIG. 1.
Figure 3B:
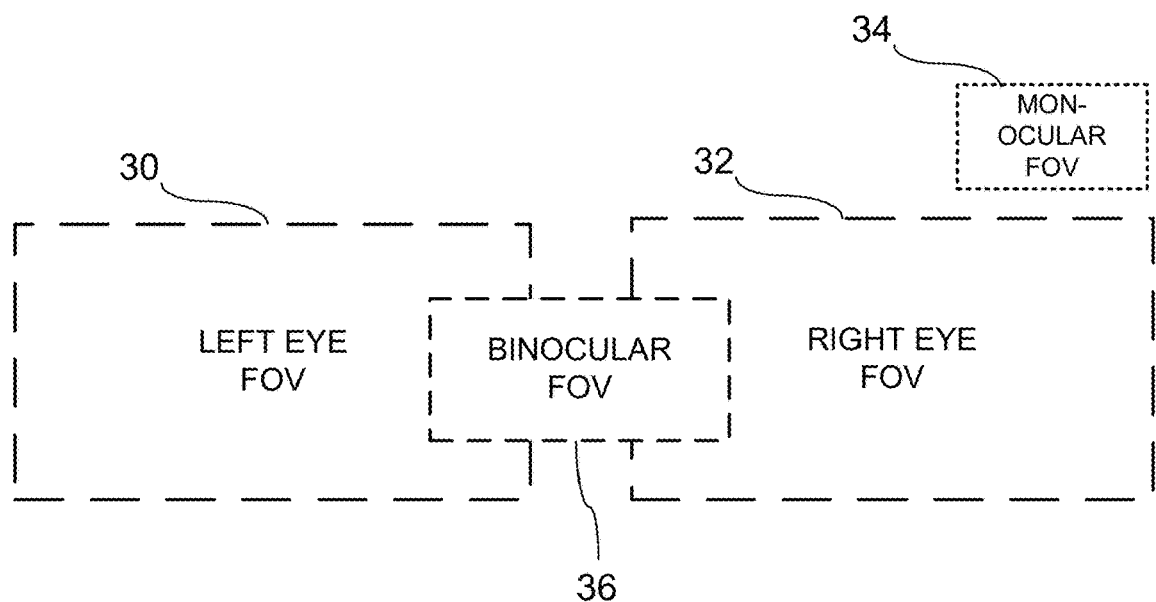
FIG. 3B is a front view of the stereoscopic field of view of the prior art AR eye wear of FIG. 1 in comparison to a monocular prior art field of view.
Figure 4A:
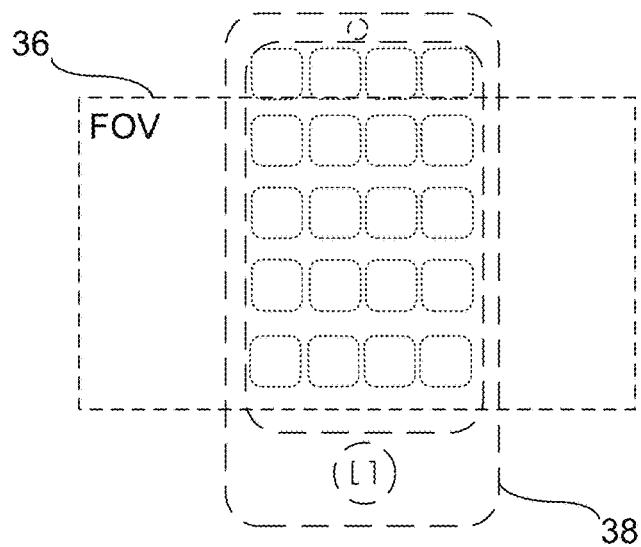
FIG. 4A is a front view of a prior art AR form of a smartphone as seen through the prior art AR eye wear of FIG. 1.
Figure 4B:
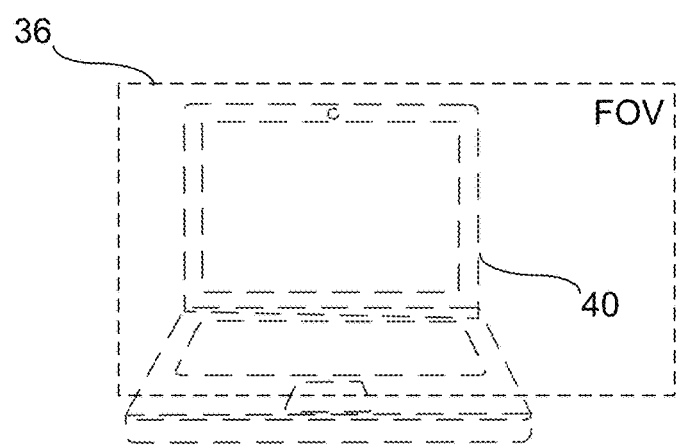
FIG. 4B is a front view of a prior art AR form of a laptop as seen through the prior art AR eye wear of FIG. 1.
Figure 5:
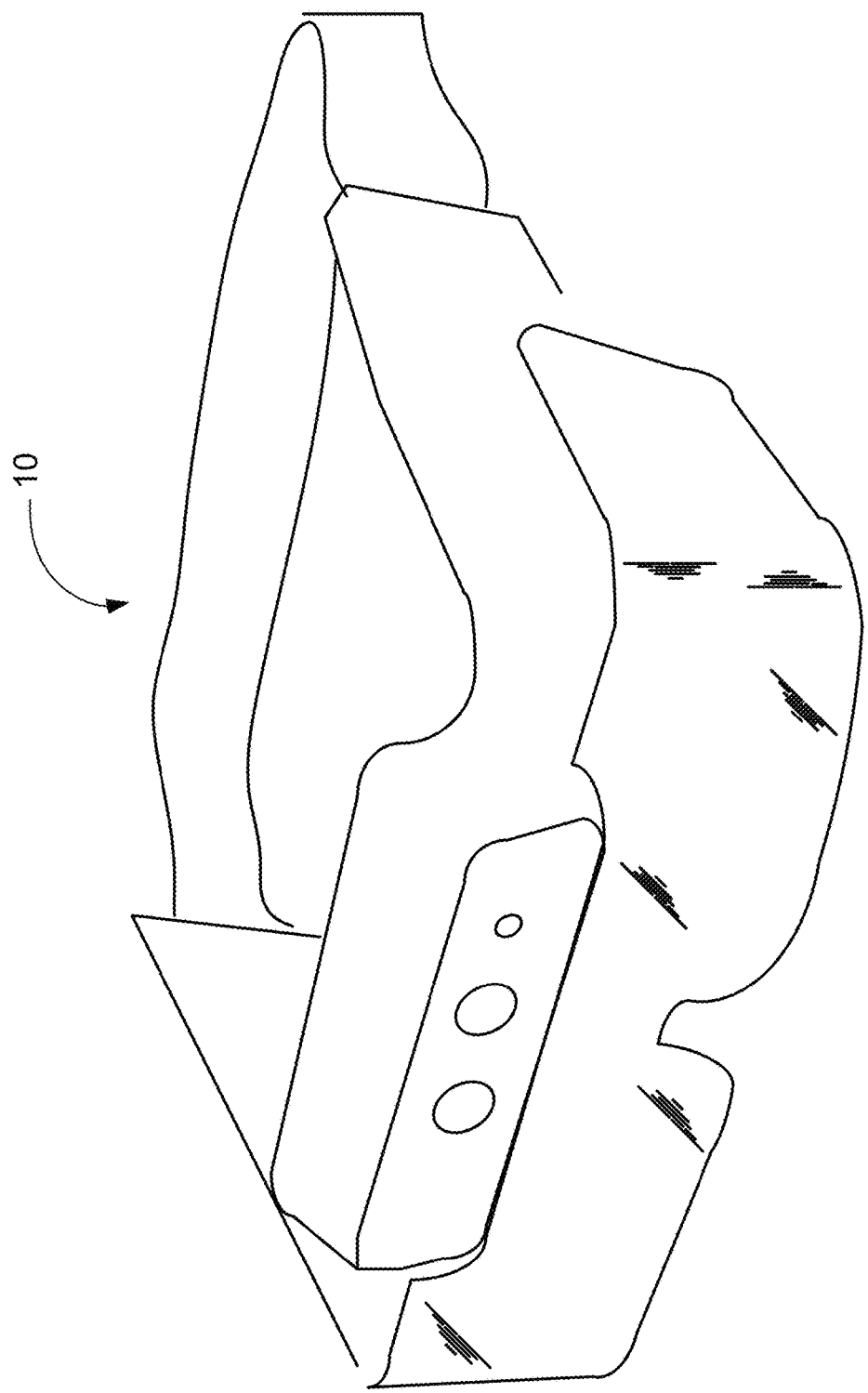
FIG. 5 is a perspective view of a prior art AR eye wear.
Figure 6:
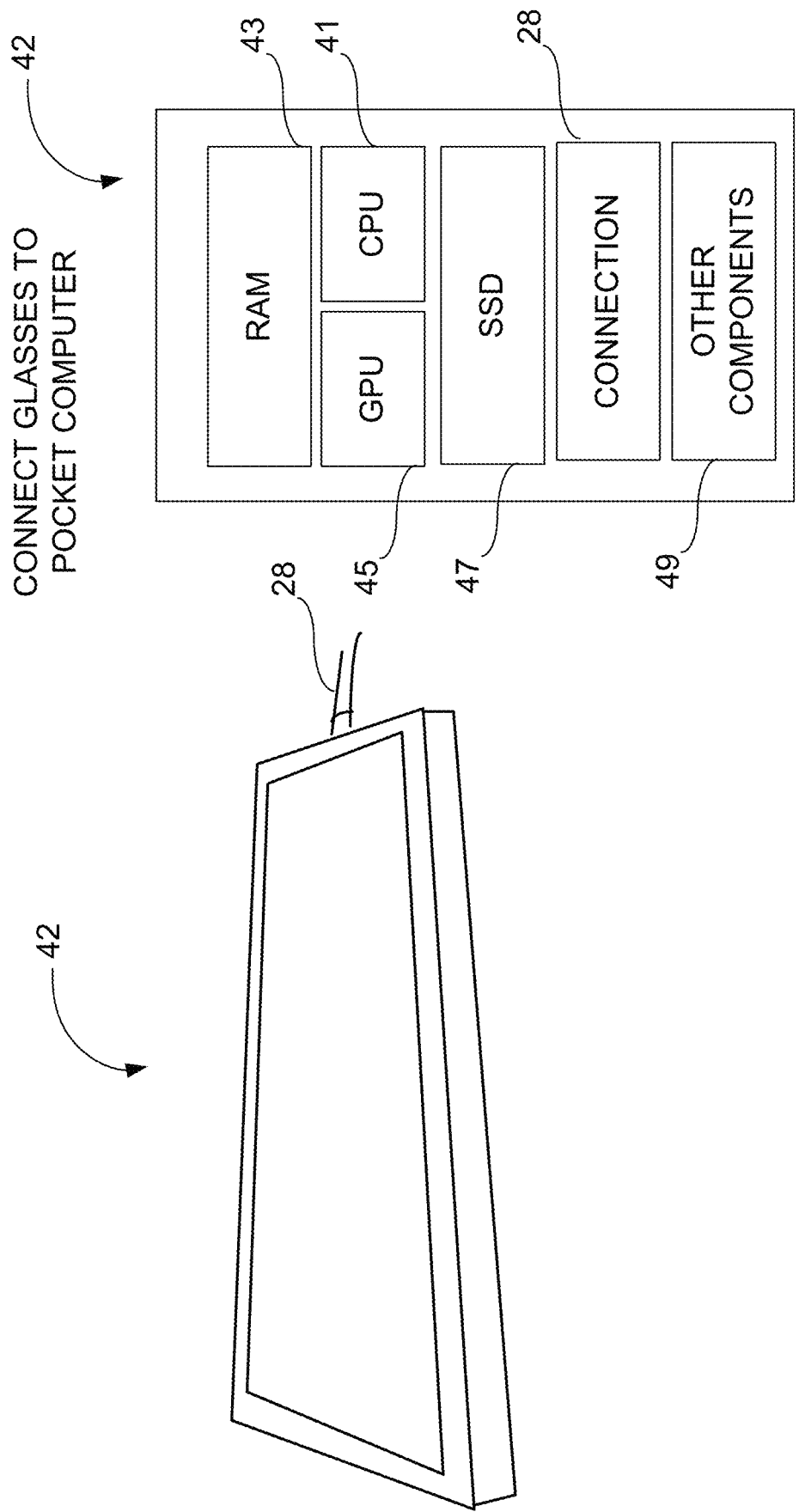
FIG. 6 is a detail view of a prior art pocket computer that co-operates with the prior art of FIGS. 1-4.

FIGS. 1A-6 are representative of the state of the prior art described and illustrated at https://web.archive.org/web/20140413125352/https://www.spaceglasses.com/ as archived on Apr. 13, 2014, which is incorporated herein by reference in its entirety. FIGS. 1A-B are a front view of a prior-art ar eye wear and its components; FIG. 2 is an exploded view of the prior art ar eye wear of FIGS. 1A-B; FIGS. 3A-B are a rear view of the prior art ar eye wear of FIG. 1A and a front view of the binocular (stereoscopic) field of view of the prior art ar eye wear of FIG. 1A in comparison to a monocular prior art field of view; FIGS. 4A-B are a front view of the prior art ar form of (A) a smart phone and (B) a laptop, each as seen through the prior art ar eye wear of FIGS. 1A-B; FIG. 5 is a perspective view of a prior art ar eye wear; FIG. 6 is a detail view of a prior art pocket computer 42 that co-operates with the prior art of FIGS. 1A-4B. The pocket computer 42 includes CPU 41, RAM 43, GPU 45, SSD 47, Other components 49 and Connection 28. Examples for these components are a 1.5 GHz Intel i5 (Central Processing Unit) CPU 41, 4 GB of (Random Access Memory) RAM 43, High power (Graphics Processing Unit) GPU 45 and 128 GB (Solid-State Drive) SSD 47 (more generally, could be another form of storage drive). The ar-eyewear 10 includes a frame 22 a left and a right lens 24, sound-sensor 14 (microphone), a left and right speaker 26 (surround sound), motion-sensor 12 (9 axis motion tracking: accelerometer, gyroscope and compass), camera 16 and depth-camera 18 and left and right ar-display 20. The ar-eyewear 10 is connected to the computer 42 via a connection 28. The ar-eyewear 10 and the computer 42 can be two units, or provided in an integrated unit. When looking through ar-eyewear 10 a user 58 can see a left-fov 30 and a right-fov 32 (field of view) with their eyes, as well as a binocular-fov 36 which can be used to displays stereoscopic information that augments the left-fov 30 and right-fov 32 via the left and right ar-display 20 respectively. A user 58 interface is provided by the computer 42 allowing a user 58 to interact with the computer 42 via the ar-eyewear 10 (e.g. by using the depth-camera 18 and camera 16 as input devices) and in some cases an auxiliary input device such as a touchpad provided on the computer 42. The functionality of the ar-eyewear 10 and computer 42 is embodied in software, e.g. data structures and instructions, created, read, updated, and deleted from SSD 47, RAM 43, Other components 49 by CPU 41, GPU 45, and by the ar-eyewear 10 via Connection 28. In some ar-eyewear 10, there is only one ar-display 20 and only a monocular-fov 34 is possible. It is to be understood that a smartphone can be used as an ar-eyewear 10 that need not be fixed to the user 58. It has been contemplated that using the ar-eyewear 10 and computer 42 a mirrored-phone 38 or mirrored-laptop 40 could be made to appear in the binocular-fov 36 of a user 58 such that the user 58 can operate the mirrored devices in a manner that is substantially the same as if a real device were in front of them. It is contemplated that these mirrored devices could be entirely emulated, or alternatively in communication with real-world physical counterparts. It is clear however that as illustrated, it is not possible to capture images or video of the user 58 of the ar-eyewear 10 using the mirrored-phone 38 or mirrored-laptop 40. Similarly, the user 58 of the ar-eyewear 10 cannot only use conventional video or camera applications operating on computer 42 to capture images of the user while they are wearing the ar-eyewear.

Figure 7A:
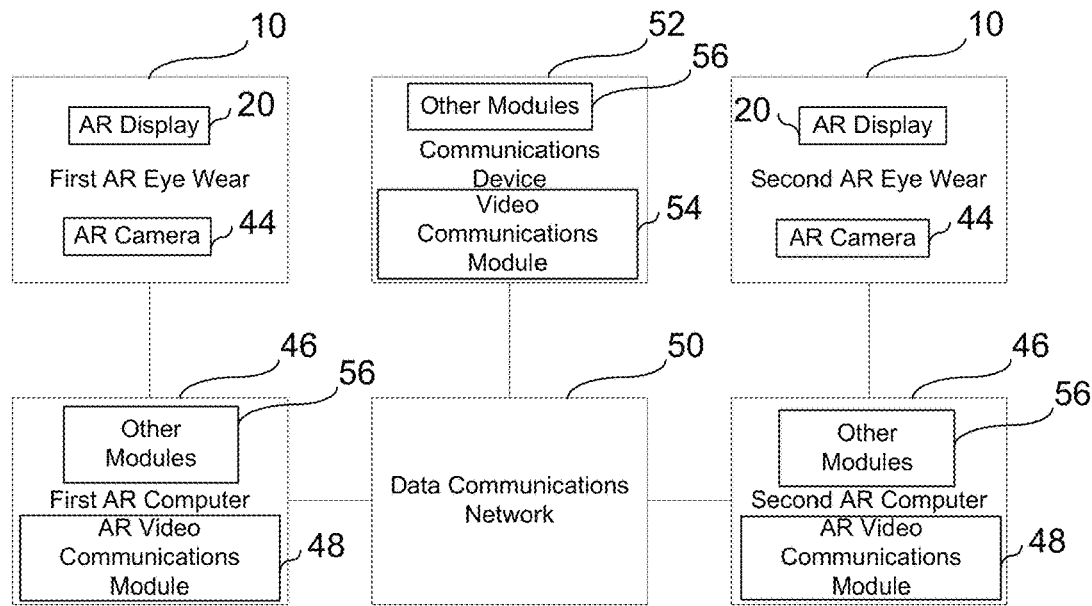
FIG. 7A is a block diagram view of an AR video communication system provided in accordance with an embodiment of the present application.
Figure 7B:
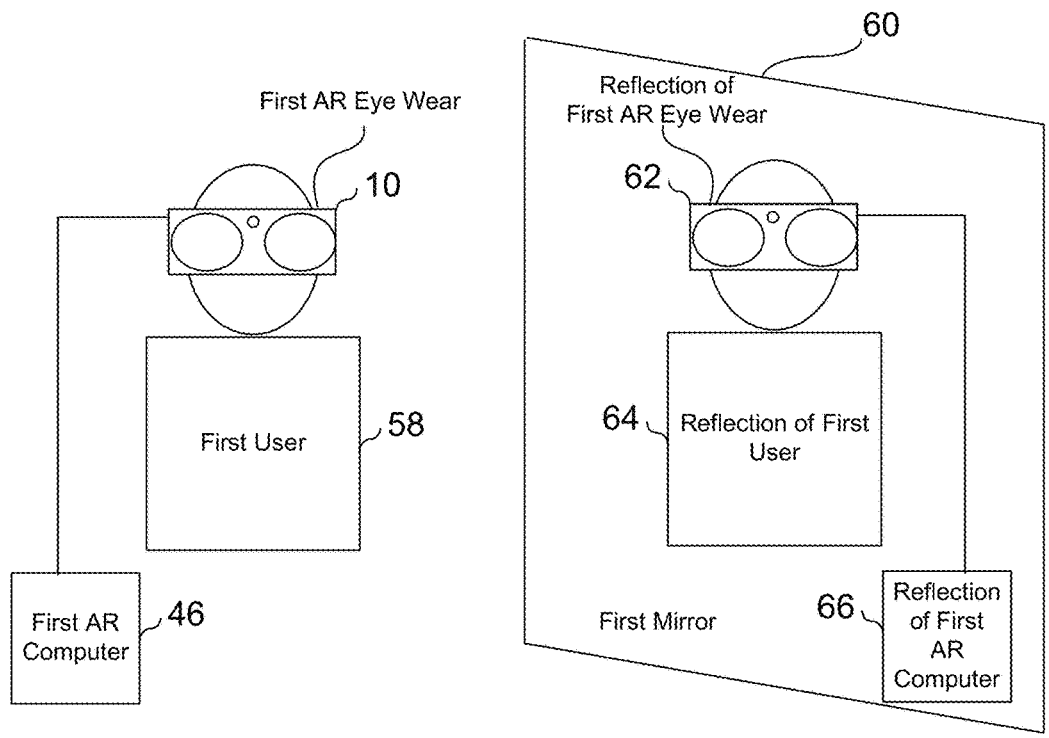
FIG. 7B is a block diagram view of a first mirror used in conjunction with the first AR eye wear and first AR computer provided in accordance with an embodiment of the present application.

FIGS. 7A-B are a block diagram view of (A) an AR video communication system provided in accordance with an embodiment of the present application and (B) a first mirror 60 used in conjunction with the first ar-eyewear 10 and first ar-computer 46 provided in accordance with an embodiment of the present application. A first and second ar-computer 46, and a communications-device 52 are connected via a data-communications-network 50. In one embodiment, each of the ar-computer 46 are substantially similar to the pocket computer 42 illustrated in FIG. 6, except for at least the ar-video-communication-module 48, and optionally some portions of the other-modules 56, which are provided as software an/or hardware in SSD 47, RAM 43, or via other components 49. It is contemplated that other components 49 could include a holographic processing unit, for example.

As shown in FIG. 7A, each of the first and second ar-computer 46 is in communication with a first and second ar-eyewear 10. Each of the first and second ar-eyewear 10 includes an ar-display 20 and an ar-camera 44. In one embodiment, the ar-display 20 and the ar-camera 44 are provided by the prior art ar-eyewear 10 of FIGS. 1-5, except for the effect of any portions of the ar-video-communications-module 48 or other-modules 56. In alternative embodiments, the split between the ar-eyewear 10 and the ar-computer 46 may be different, or may be fully integrated into a single unit. A more conventional communications-device 52 is also illustrated including other-modules 56 and a video-communications-module 48 to illustrate that ar-eyewear 10 users and non-ar-eyewear 10 users are advantageously enabled to have video communications due to embodiments of the present application. The data-communications-network 50 may include various access networks, including wireless access networks, such as cellular and wi-fi access networks or the like, such that the communications between the various blocks may be wireless.

As shown in FIG. 7B, a first user 58 wearing a first ar-eyewear 10 connected to a first ar-computer 46. Advantageously, the first ar-eyewear 10 is looking at a first mirror 60 in which the first user 58, and consequently the ar-camera 44 of the first ar-eyewear 10, sees: a reflection of first user 58 (reflection-user 64), a reflection of first ar-eyewear 10 (reflection-ar-eyewear 62), and a reflection of first ar-computer 46 (reflection-ar-computer 66).

Figure 8A:
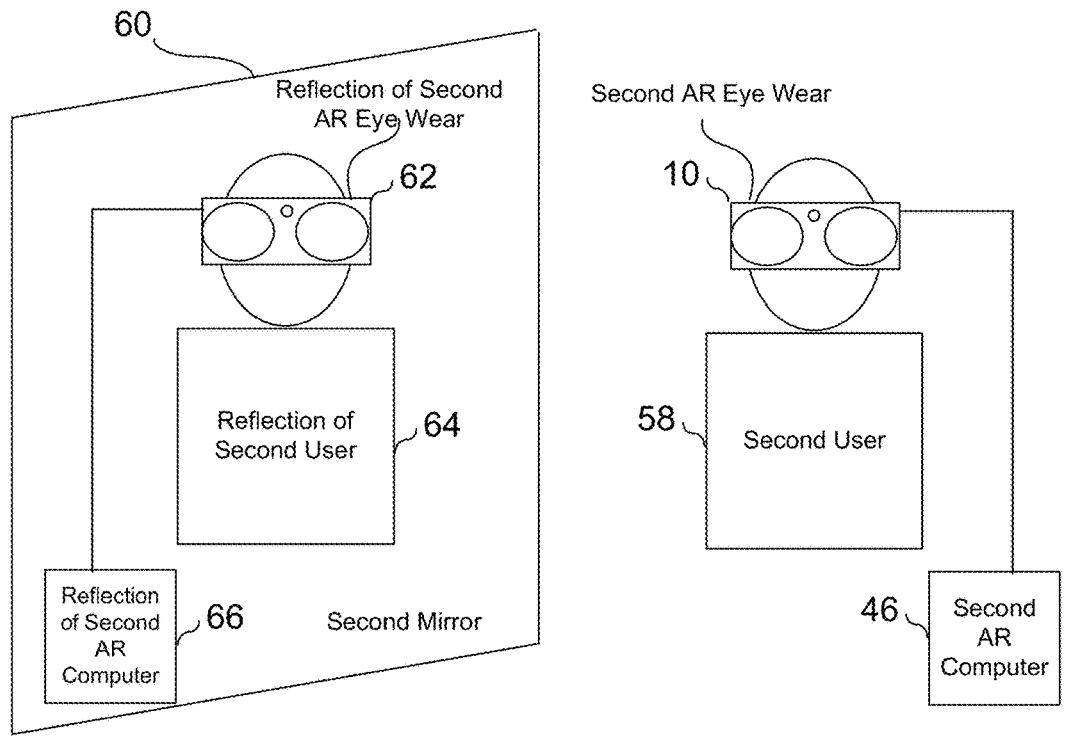
FIG. 8A is a block diagram view of a second mirror used in conjunction with the second AR eye wear and second AR computer provided in accordance with an embodiment of the present application.
Figure 8B:
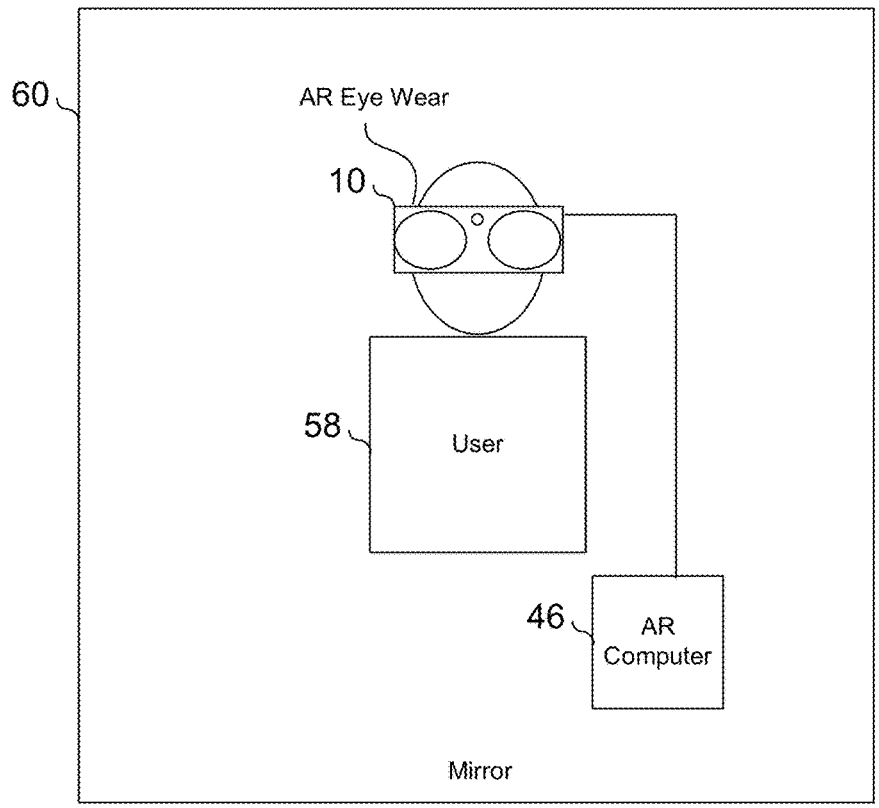
FIG. 8B is a view of what a users may see in the mirror provided in accordance with an embodiment of the present application.

FIGS. 8A-B are a block diagram view of a (a) second mirror 60 used in conjunction with the second ar-eyewear 10 and second ar-computer 46 provided in accordance with an embodiment of the present application and (b) what a user 58 may see in the mirror 60 provided in accordance with an embodiment of the present application.

As shown in FIG. 8A, a second user 58 wearing a second ar-eyewear 10 connected to a second ar-computer 46. Advantageously, the second ar-eyewear 10 is looking at a second mirror 60 in which the second user 58, and consequently the ar-camera 44 of the second ar-eyewear 10, sees: a reflection of second user 58, a reflection of second ar-eyewear 10, and a reflection of second ar-computer 46.

As shown in FIG. 8B, the reflection that a user 58 sees includes an ar-eyewear 10, the user 58, and an ar-computer 46. The mirrors in the drawings of this application are for illustrative purposes only. In alternate embodiments, the mirrors may be household mirrors, car mirrors, mirrored siding of a building, a compact mirror 60, a shiny chrome surface, a glass surface or more generally any surface that reflects at least a portion of the image of the user 58 of an ar-eyewear 10 and/or the ar-eyewear 10 such that it can be captured with the ar-camera 44 in the ar-eyewear 10. In one embodiment, a mirror 60 is provided by an application operating on a device such as a tablet, a smartphone, a computer 42 or any other device capable of providing an observer with an image. In the case of a tablet, smartphone or computer 42, the use of a forward facing camera 16 provided on the tablet, smartphone or computer 42 can provide the user 58 of the ar-eyewear 10 with the equivalent of a mirror 60. There need not be a communications path between the tablet, smartphone or computer 42 in such an embodiment as those devices would be used as a mirror 60. Mirror 60 applications are available, for example, on smartphones and tablets, and the camera 16 application of those devices, when configured to use the camera 16 on the same surface as the display 74, is another way to provide a mirror 60 in accordance with the present application.

Figure 9A:
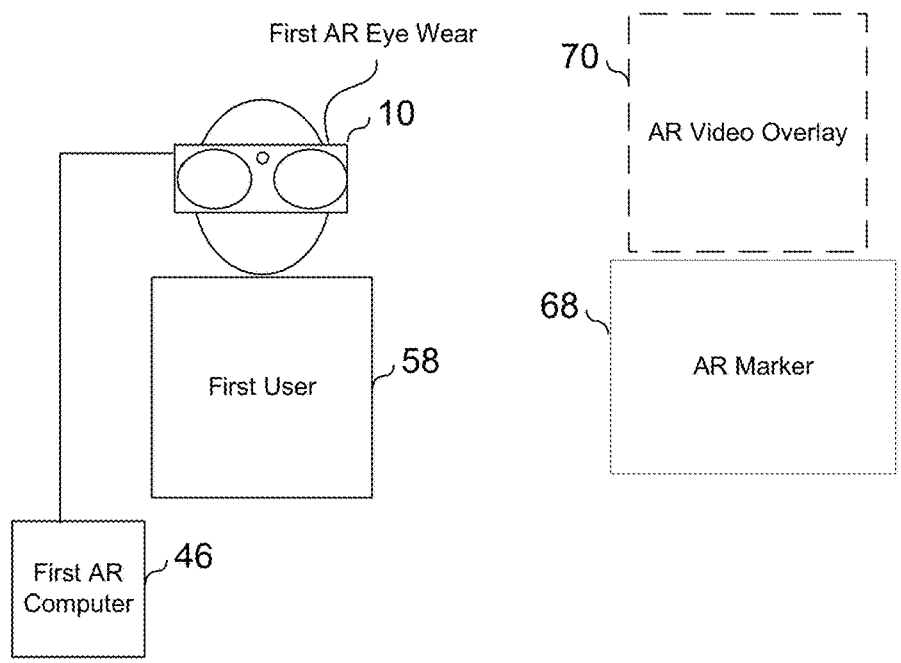
FIG. 9A is a block diagram view of a first user wearing a first AR eye wear and using a first AR computer to display an AR video overlay over an AR marker provided in accordance with an embodiment of the present application.
Figure 9B:
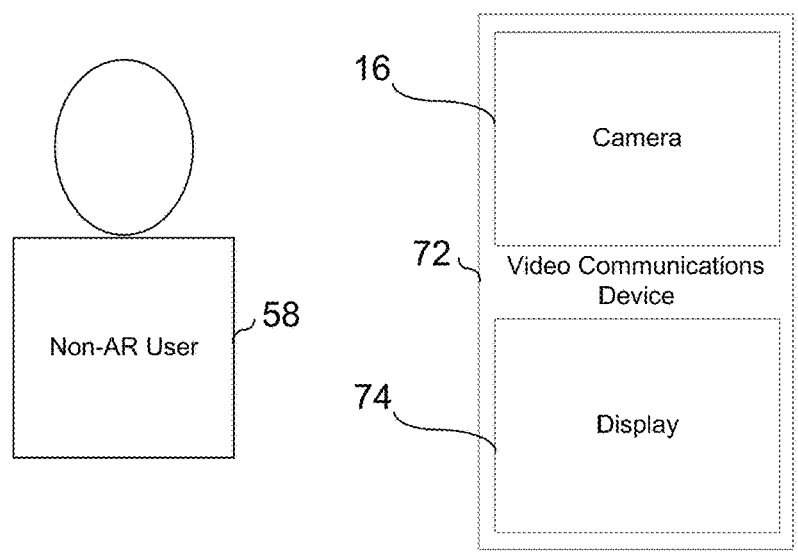
FIG. 9B is block diagram view of a non-AR user using a video communication device provided in accordance with an embodiment of the present application.

FIGS. 9A-B are a block diagram view of a (A) first user 58 wearing a first ar-eyewear 10 and using a first ar-computer 46 to display 74 an ar-video-overlay 70 over an ar-marker 68 provided in accordance with an embodiment of the present application, and (B) a non-ar user 58 using a video-communication-device provided in accordance with an embodiment of the present application.

As shown in FIG. 9A, an ar-marker 68 is provided in order to facilitate the positioning of the ar-video-overlay 70 in which video communications are displayed. In one embodiment, an image of the ar-eyewear 10 is used for the ar-marker 68, such that, when first user 58 looks at himself in the mirror 60, the ar-video-overlay 70 is position Ned automatically in relation to the reflection of the ar-eyewear 10. In absence of a mirror 60, an ar-marker 68 can be provided on paper or on an electronic display 74 device. In another embodiment, the ar-marker 68 is an image that the user 58 of the first ar-eyewear 10 takes using the ar-eyewear 10 ar-camera 44 such that there is no need for a paper ar-marker 68. Suitable images could be a painting on a wall, or any other item that would distinguish from the background and provide a reference location for displaying the ar-video-overlay 70, such as for example the reflection of the face of the user 58 in the mirror 60 recognized through facial recognition.

As shown in FIG. 9B, a non-ar user 58 utilises a video-communications-device 72 having a conventional camera 16 and display 74 to participate in video communications with the first and/or second user 58. Although not shown in the drawings, in some embodiments, a mobile device such as a smartphone or tablet can be used to provide a combined ar-eyewear 10 and ar-computer 46, whereby holding the smartphone or tablet near the user's face without fully obscuring it in front of a mirror 60 would enable augmenting the video that the user 58 sees to include an ar-video-overlay 70. In some embodiments, the ar-marker 68 of FIG. 9A is an image of a smartphone or a tablet.

Figure 10A:
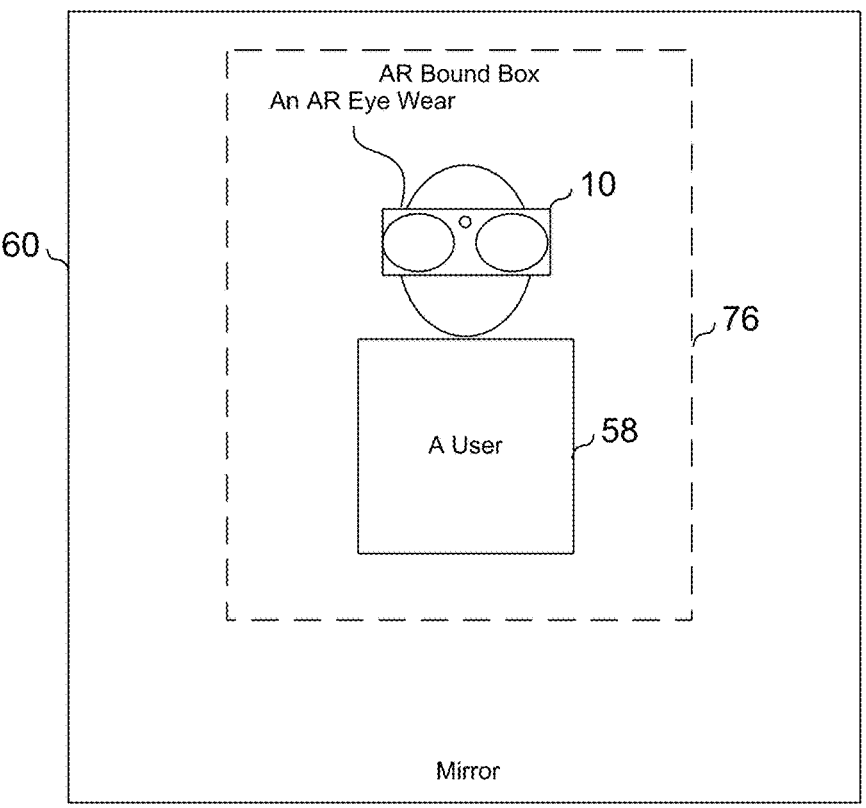
FIG. 10A is a block diagram view of an AR bound box around the reflection of a user in a mirror as seen by a user of an AR eye wear provided in accordance with an embodiment of the present application.
Figure 10B:
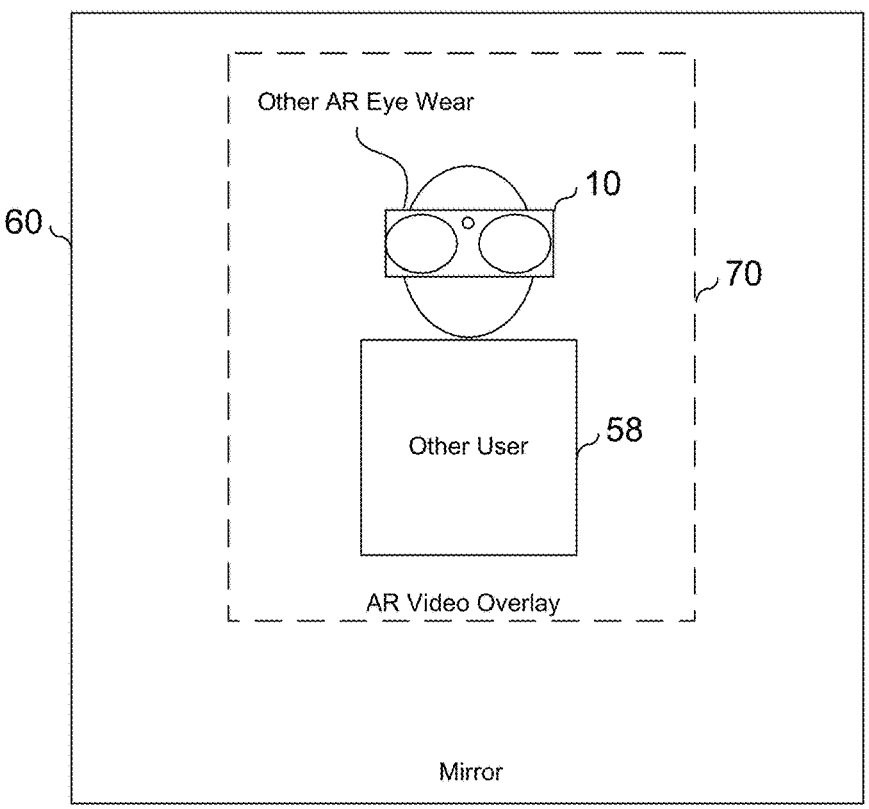
FIG. 10B is a block diagram view of an AR video overlay displaying an image of an other user wearing an other AR eye wear as seen by the a user wearing an AR eye wear provided in accordance with an embodiment of the present application.

FIGS. 10A-B are a block diagram view of a (A) an ar-bound-box 76 around the reflection of a user 58 in a mirror 60 as seen by a user 58 of an ar-eyewear 10 provided in accordance with an embodiment of the present application and (B) an ar-video-overlay 70 displaying an image of an other user 58 wearing an other ar-eyewear 10 as seen by a user 58 wearing an ar-eyewear 10 provided in accordance with an embodiment of the present application.

As shown in FIG. 10A, an ar-bound-box 76 is displayed in the field of view of a user 58 as seen through the ar-eyewear 10. The ar-bound-box 76 can be either dimensioned automatically in proportion to the scale of the ar-eyewear 10 (e.g. recognizing the image of the ar-eyewear 10 reflection as an ar-marker 68), or manipulated by the user 58 by performing grab, point, pinch swipe etc. (actions one would use on real world objects), that the other-modules 56 in the ar-computer 46 are configured to recognize and relay to the ar-video-communications-module 48. The purpose of the ar-bound-box 76 is to delimit the area of the field of view of the ar-camera 44 that will be used by the ar-video-communications-module 48.

As shown in FIG. 10B, an ar-video-overlay 70 is displayed in the field of view of a user 58 as seen through the ar-eyewear 10. The ar-video-overlay 70 in this embodiment overlaps with the ar-bound-box 76 such that the reflection of the user 58 is augmented by replacing with video received by the ar-video-communications-module 48. As illustrated, the ar-video-overlay 70 in this instance shows the image of an other user 58 who is also wearing an other ar-eyewear 10.

Figure 11A:
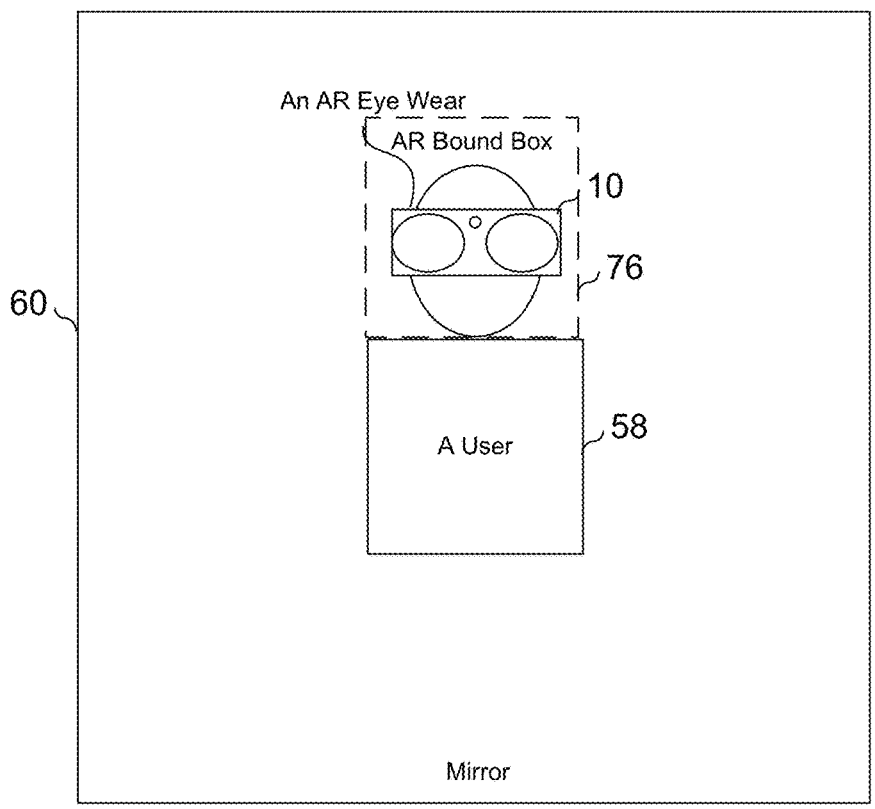
FIG. 11A is a block diagram view of an AR bound box around the reflection of a user in a mirror as seen by a user of an AR eye wear provided in accordance with an embodiment of the present application.
Figure 11B:
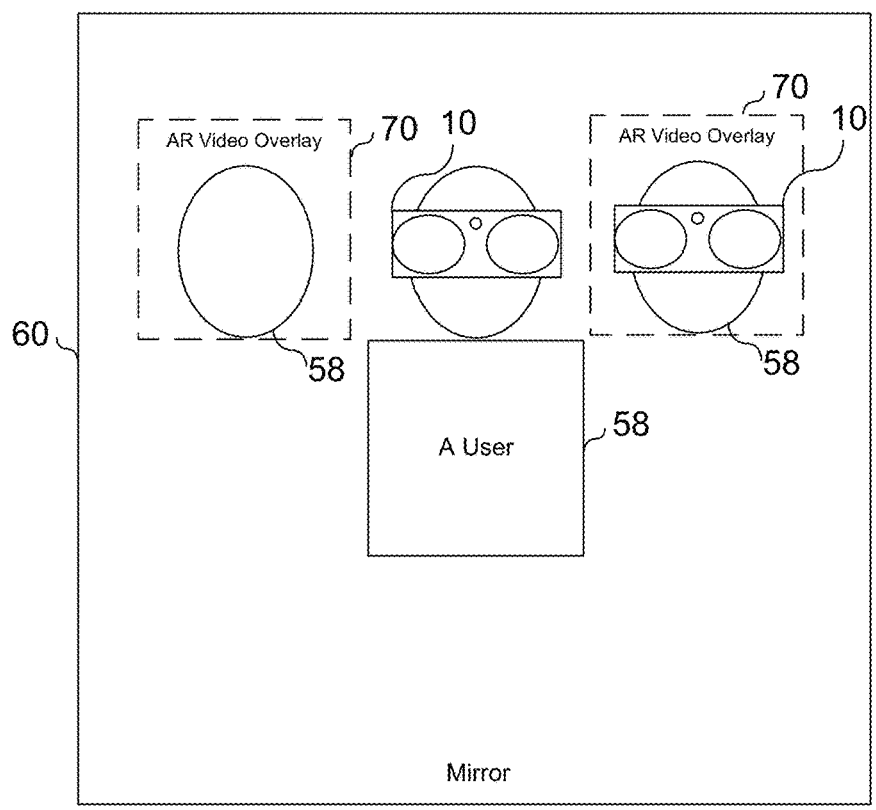
FIG. 11B is block diagram view of two AR video overlay displaying an image of two other users, one wearing an other AR eye wear and the other not wearing any AR eye wear, as seen by a user wearing an AR eye wear provided in accordance with an embodiment of the present application.

FIGS. 11A-B are a block diagram view of (A) an ar-bound-box 76 around the reflection of a user 58 in a mirror 60 as seen by a user 58 of an ar-eyewear 10 provided in accordance with an embodiment of the present application and (B) two ar-video-overlay 70 displaying an image of two other users, one wearing an other ar-eyewear 10 and the other not wearing any ar-eyewear 10, as seen by the a user 58 wearing an ar-eyewear 10 provided in accordance with an embodiment of the present application.

As shown in FIG. 11A, an ar-bound-box 76 which only covers the face of a user 58 wearing an ar-eyewear 10 is illustrated. In alternative embodiments, the ar-bound-box 76 may include only a portion of a face of a user 58, such as for example, when using the rear view mirror 60 of a car, or a compact mirror 60.

As shown in FIG. 11B, although the ar-bound-box 76 of FIG. 11A is being utilized to delimit the area of the filed of view of the ar-camera 44 that will be used by the ar-video-communications-module 48, two separate and disjoint ar-video-overlay 70 are being displayed. The one to the left of the reflection of a user 58 is for another user 58 that is not wearing an ar-eyewear 10, whereas the ar-video-overlay 70 to the right of the reflection of a user 58 shows another user 58 wearing an ar-eyewear 10.

In some embodiments, a self-view is displayed in an ar-video-overlay 70 when the reflection of the user 58 is obscured by an ar-video-overlay 70. In other embodiments, the reflection of the user 58 is omitted. Variations on the position and number of ar-video-overlay 70, as well as their content, would be obvious to a person of skill in the art depending on the application of the techniques of the present application, and thus are considered to have been enabled by the teachings of this application.

Figure 12:
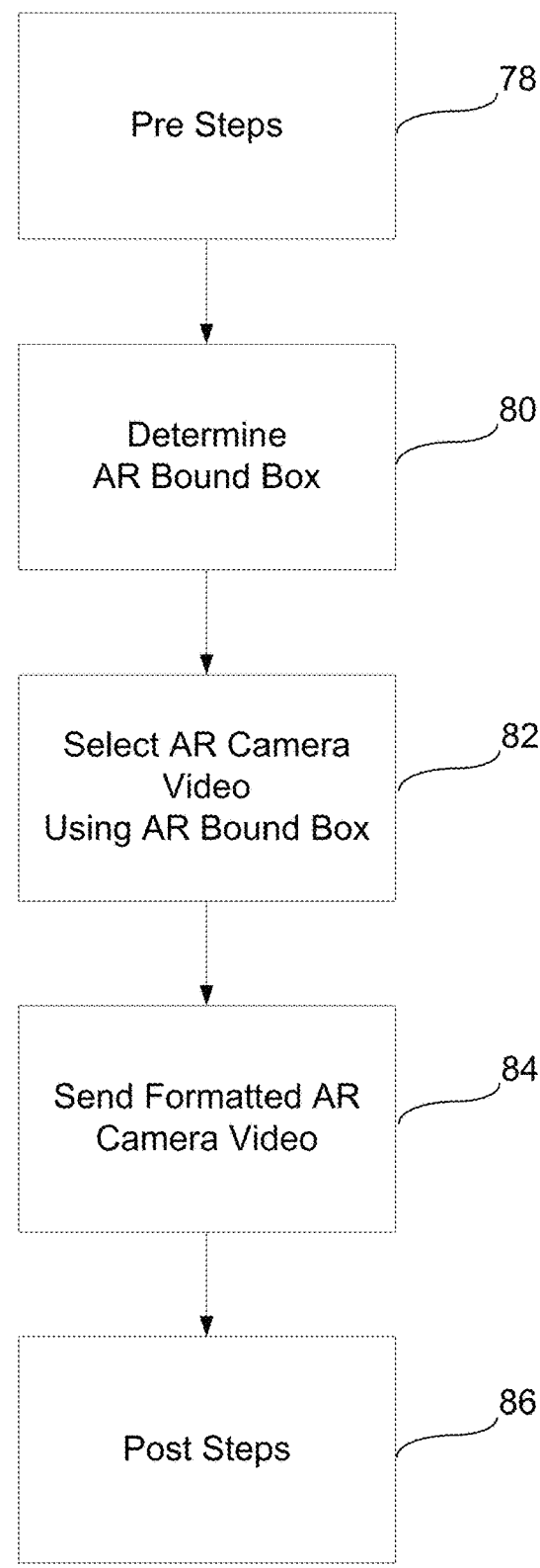
FIG. 12 is a flowchart view of acts taken to capture and send video communications using an AR eye wear provided in accordance with an embodiment of the present application.

FIG. 12 is a flowchart view of acts taken to capture and send video communications using an ar-eyewear 10 provided in accordance with an embodiment of the present application.

At the act pre-steps-send 78, optionally some steps can be taken in advance to configure the ar-video-communications-module 48 and other-modules 56. For example, any signalling required to establish a communications path between end points can be performed here, as well as any steps required to configure ar-markers (if used), facial recognition, camera 16 calibration, and relative position of user 58 interface elements.

At the act determine-ar-bound-box 80, an ar-bound-box 76 is determined to delimit the portion of the field of view of the ar-camera 44 that will be utilised by the ar-video-communications-module 48. This ar-bound-box 76 may be determined automatically by recognizing the reflected face or ar-eyewear 10 of the user 58 in a mirror 60, by recognizing an ar-marker 68, or may be determined by user 58 manipulation (grab, point, pinch, swipe, etc.) using their hands, or a combination of both.

At the act of select-ar-camera-video 82, using ar-bound-box 76, the ar-bound-box 76 previously determined is used to select the portion of the field of view of the ar-camera 44 that will be utilised by the ar-video-communications-module 48.

At the act of send-formatted-ar-camera-video 84, the ar-video-communications-module 48 formats (if necessary) the ar-camera 44 data using the ar-bound-box and sends the formatted-ar-camera-video via the data-communications-network 50. Formatting includes for example acts that are known in the art, such as correcting for the alignment of the mirror with the camera, and cropping the video to include only the portion that is delimited by the ar-bound-box.

At the act of post-steps-send 86, optionally steps to terminate the video communication are taken, such as terminating the communications path between the endpoints, reclaiming resources, storing preferences based on location or ar-marker 68 data used, ar-bound-box 76, etc.

Figure 13:
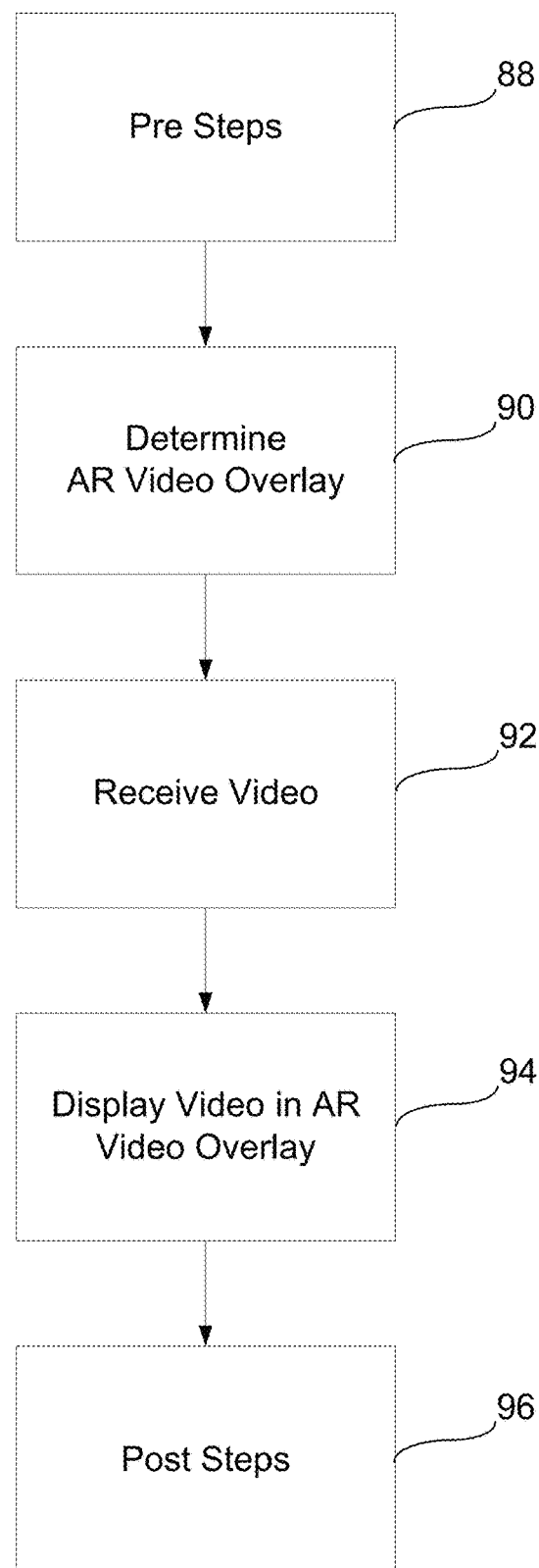
FIG. 13 is a flowchart view of acts taken to receive and display video communications using an AR eye wear provided in accordance with an embodiment of the present application.

FIG. 13 is a flowchart view of acts taken to receive and display 74 video communications using an ar-eyewear 10 provided in accordance with an embodiment of the present application.

At the act pre-steps-receive 88, optionally some steps can be taken in advance to configure ar-video-communications-module 48 and other-modules 56. For example, any signalling required to establish a communication path between end points can be performed here, as well as any steps required to configure ar-markers (if used), and relative position of user 58 interface elements.

At the act determine-ar-video-overlay 90, an ar-video-overlay 70 is dimensioned and positioned relative to the user 58. If a mirror 60 is available, the ar-video-overlay 70 is positioned on the surface of the mirror 60. In some embodiments, the ar-video-overlay 70 may be determined automatically by recognizing the reflected face or ar-eyewear 10 of the user 58 in a mirror 60, by recognizing an ar-marker 68, or may be determined by user 58 manipulation (grab, point, pinch, swipe, etc.) using their hands, or a combination of both.

At the act of receive-video 92, the ar-communications-module receives video data from the data-communications-network 50 and formats it (if necessary) such that the ar-display 20 is capable of displaying it.

At the act of display-video-in-ar-video-overlay 94, the ar-video-communications-module 48 causes the received video to be displayed in the ar-video-overlay 70. In some embodiments, steps 90 and 92 may be reversed.

At the act of post-steps-receive 96, optionally steps to terminate the video communication are taken, such as terminating the communications path between the end points, reclaiming resources, storing preferences based on location or ar-marker 68 data used, ar-video-overlay 70, etc.

Operationally, hand tracking with natural interactions techniques is provided by the other modules in the ar-computer 46, such as grab, point, pinch, swipe, etc. (actions you would use on real world objects). Holographic UI components such as buttons or elements are provided to assist in the set up and tear down of communications. In some embodiments the ar-displays are 3D Holographic-displays where 3D content includes surface tracking, and being able to attach content real world objects, specifically mirrors and ar-markers. In some embodiments, a touchpad provided at the ar-computer 46 enables user 58 input.

Figure 14:
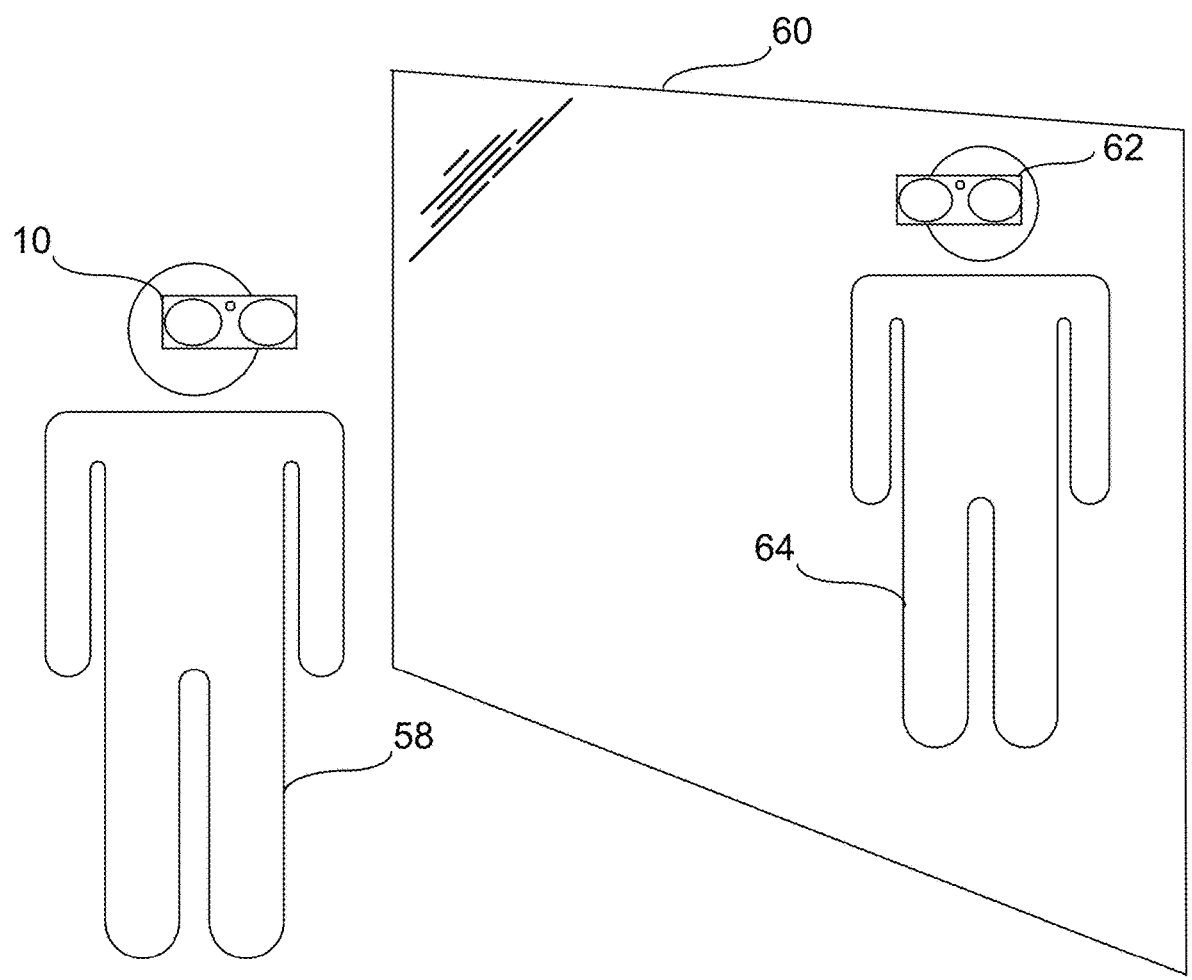
FIG. 14 is a front perspective view of a FIG. 7B.

FIG. 14 is a front perspective view of FIG. 7b. A user 58 wearing an ar-eyewear 10 is looking at a mirror 60 in which the user 58, and consequently the ar-camera 44 of the ar-eyewear 10, sees: a reflection of first user 58 (reflection-user 64), a reflection of first ar-eyewear 10 (reflection-ar-eyewear 62).

Figure 15A:
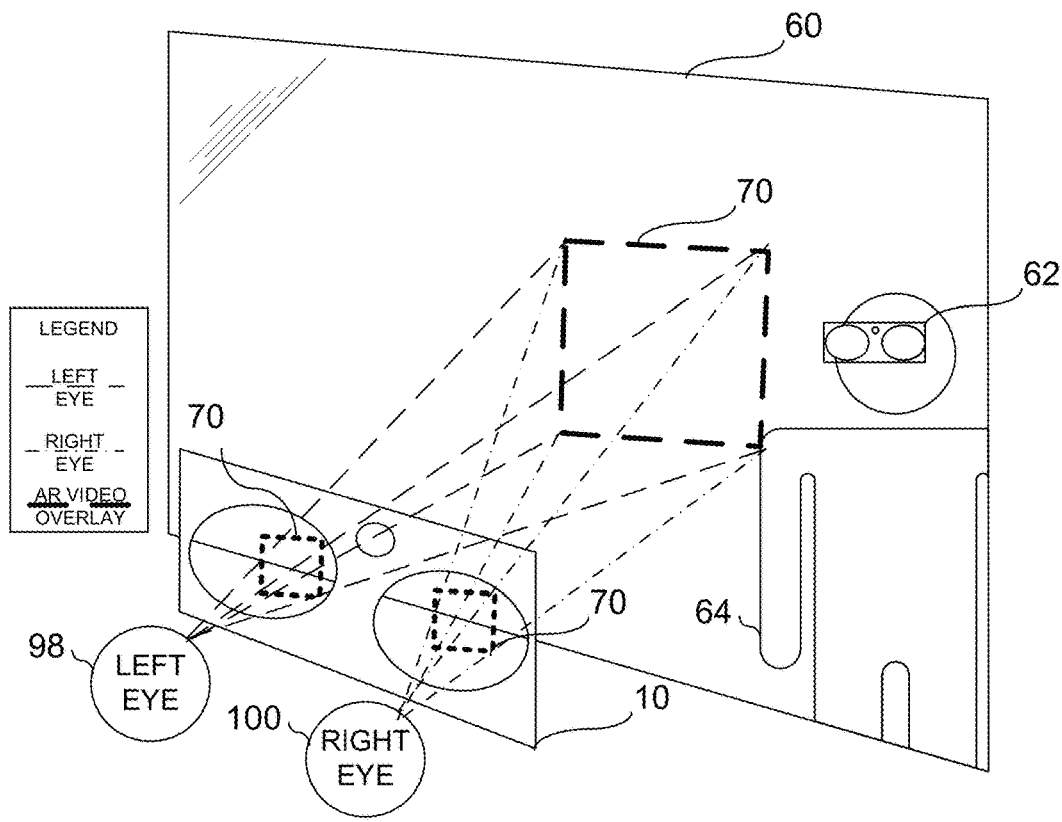
FIG. 15A is a front perspective view of an of FIG. 10 illustrating how a rectangular portion of a mirror is seen as an ar video overlay by a left eye and a right eye through the ar displays of ar eyewear.
Figure 15B:
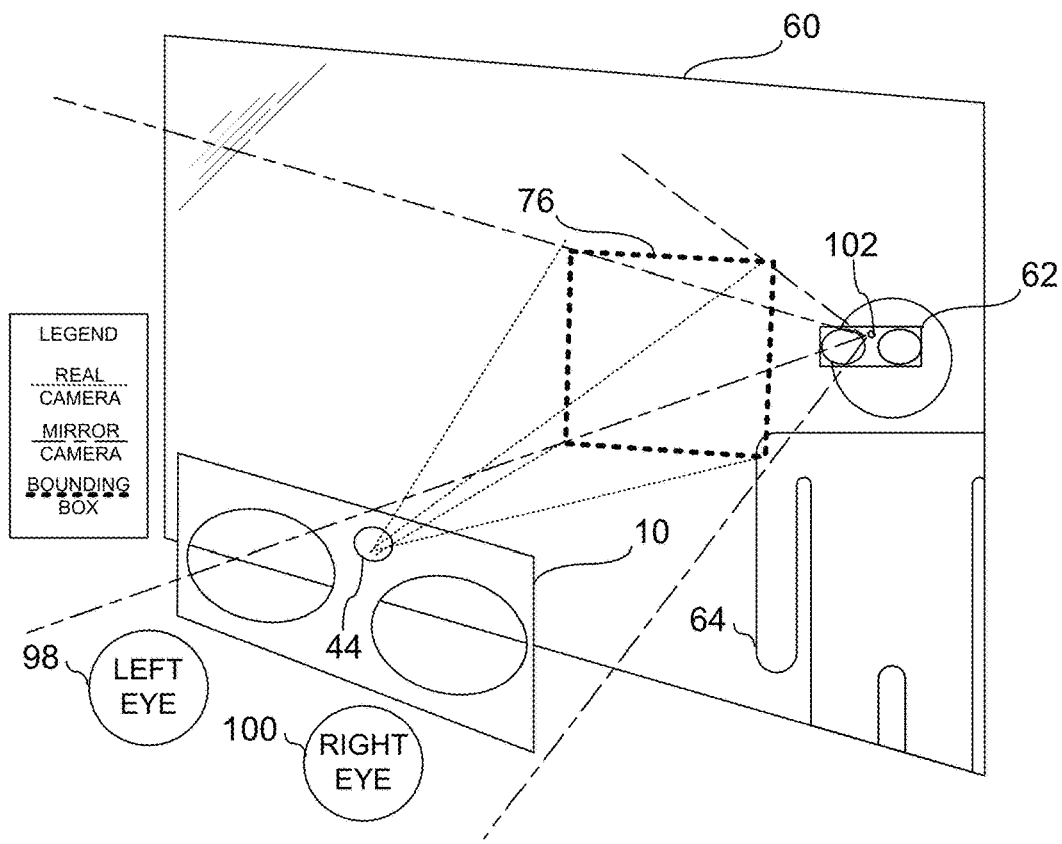
FIG. 15B is a front perspective view of an of FIG. 10 illustrating how a rectangular portion of a mirror is seen as an ar bound box by the real camera and a mirror camera.

FIG. 15 is a front perspective view of the of FIG. 10 illustrating (a) how a rectangular portion of a mirror 60 is seen as (a) an ar-video-overlay 70 by a left-eye 98 and a right-eye 100 through each of the ar-display 20 of ar-eyewear 10 and (b) an ar-bound-box 76 by the real camera 16 and a mirror 60 camera 16. In an embodiment, the ar-bound-box 76 and ar-video-overlay 70 are substantially the same size. In an embodiment, ar-video-overlay 70 is smaller or equal to the binocular-fov 36 of the ar-eyewear 10. In some embodiments, the ar-bound-box 76 is substantially the same size as the binocular-fov 36.

Figure 16A:
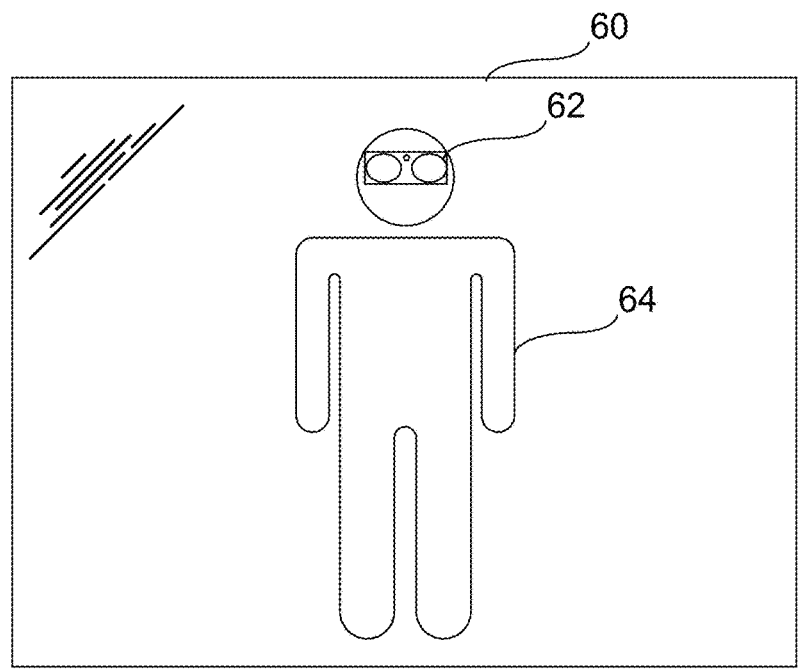
FIG. 16A is a front view of a the mirror of FIG. 14.
Figure 16B:
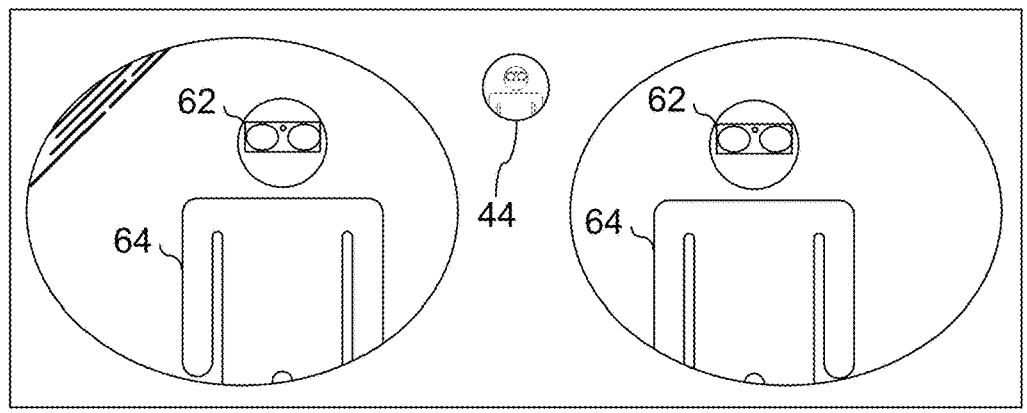
FIG. 16B is a view of the left eye, right eye, and a real camera view.
Figure 16C:
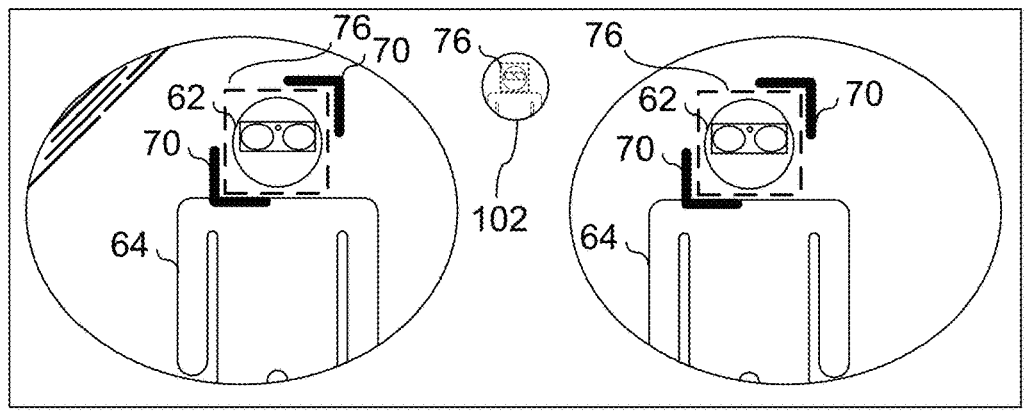
FIG. 16C is a view of an augmented left eye, right eye, and mirror camera view.

FIG. 16 is a front view of (a) the mirror 60 of FIG. 14, (b) the left-eye 98, right-eye 100, and a real ar-camera 44 view; and (c) an augmented left-eye 98, right-eye 100, and mirror-camera 102 view. As shown in FIG. 16A, the user 58 is ideally positioned normal to and centred relative to the mirror 60 to make the best use of the surface of the mirror 60. As shown in FIG. 16B, the user 58 has centred their own reflection in their left-fov 30, their right-fov 32 such that the ar-camera 44 is capable of capturing their own reflection. As shown in FIG. 16C, the ar-bound-box 76 has been determined to select the portion of the user 58 reflection for transmission thereby providing a mirror-camera 102. The ar-video-overlay 70 has been determined to coincide with the ar-bound-box 76 thereby enabling received video and transmitted video to be in similar aspect ratio.

Although not expressly shown in the drawings, in one embodiment, the ar-video-conference-module provides a device driver for the mirror-camera 102 wherein the ar-bound-box 76 has been applied to select the video of the ar-camera 44 such that the mirror-camera 102 can be utilised as if it were real with existing applications of the ar-computer 46. In one embodiment, the application is a standard video conferencing application.

As used in this application, the terms video is a data structure stored in RAM and SSD, processed by CPU and GPU, and/or communicated over data networks, and are meant to include either still or streams of moving images such that using the techniques of the present application to capture and communicate augmented reality still images is contemplated to be within the scope of this application. Likewise, in some embodiments, the use of an ar-camera having a depth-camera enables the video and still images to include 3D information.

As used in this application, the terms ar-bound-box and ar-video-overlay are data structures that ultimately map to rectangular areas of a surface in 3 dimensional space on one hand, and to a region of a video feed of a camera on the other hand, and are stored in RAM and SSD, processed by CPU and GPU, and/or communicated over data networks.

Figure 17:
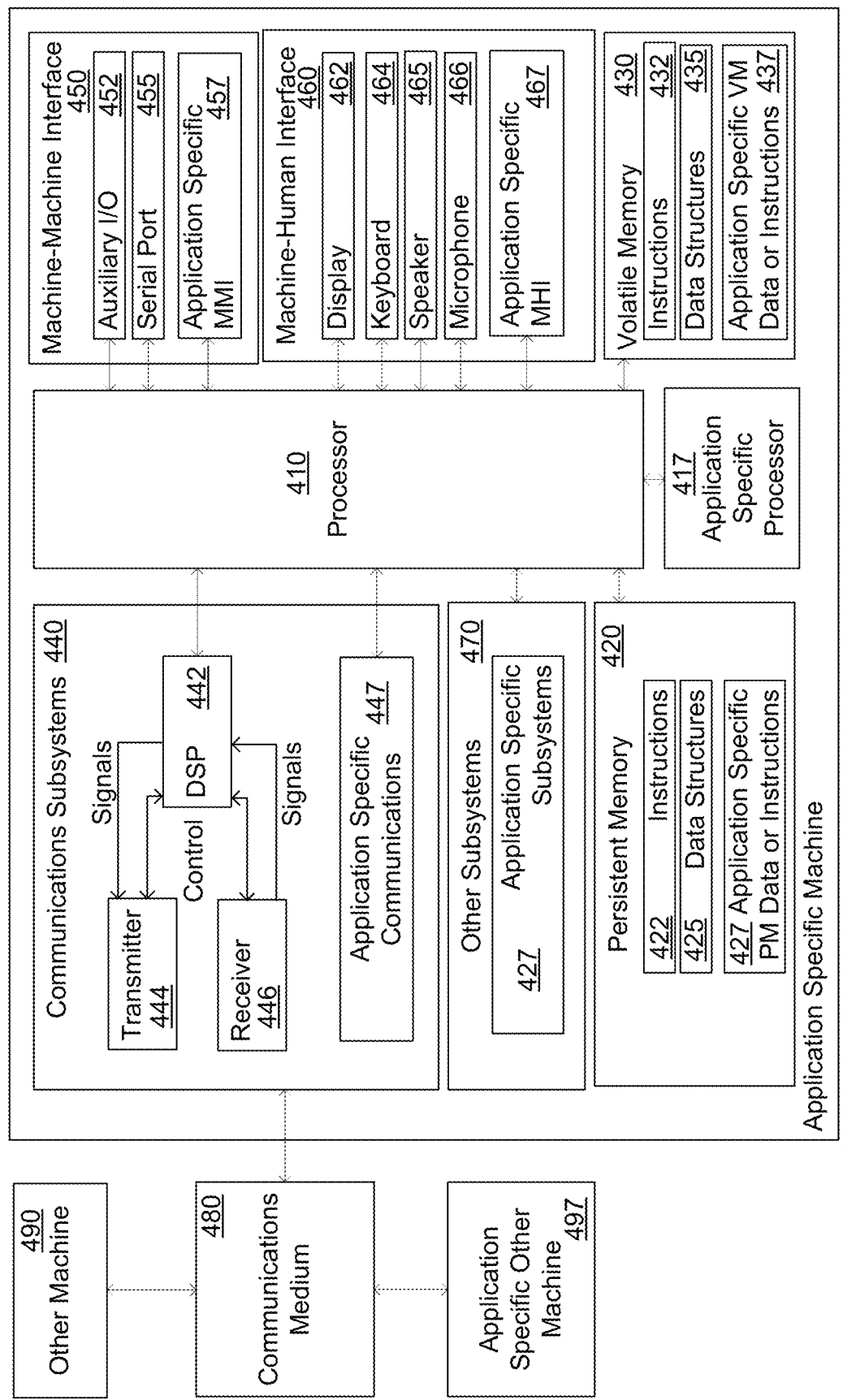
FIG. 17 is a block diagram of an exemplary device including specific components that could be used as a general purpose computer or application specific computer with embodiments of the application.

Reference is now made to FIG. 17. FIG. 17 is a block diagram of an exemplary application specific machine environment that can be used with embodiments of the present application. Application Specific Machine 400 is preferably a two-way wireless or wired communication machine having at least data communication capabilities, as well as other capabilities, such as for example audio, and video capabilities. Application Specific Machine 400 preferably has the capability to communicate with other computer systems over a Communications Medium 480. Depending on the exact functionality provided, the machine may be referred to as a smart phone, a data communication machine, client, or server, as examples.

Where Application Specific Machine 400 is enabled for two-way communication, it will incorporate communication subsystem 440, including both a receiver 446 and a transmitter 444, as well as associated components such as one or more, preferably embedded or internal, antenna elements (not shown) if wireless communications are desired, and a processing module such as a digital signal processor (DSP) 442. As will be apparent to those skilled in the field of communications, the particular design of the communication subsystem 440 will be dependent upon the communications medium 480 in which the machine is intended to operate. For example, Application Specific Machine 400 may include communication subsystems 440 designed to operate within the 802.11 network, Bluetooth™ or LTE network, both those networks being examples of communications medium 480 including location services, such as GPS. Communications subsystems 440 not only ensures communications over communications medium 480, but also application specific communications 447. An application specific processor 417 may be provided, for example to process application specific data, instructions, and signals, such as for example for GPS, near field, or other application specific functions. Depending on the application, the application specific processor 417 may be provided by the DSP 442, by the communications subsystems 440, or by the processor 410, instead of by a separate unit.

Network access requirements will also vary depending upon the type of communications medium 480. For example, in some networks, Application Specific Machine 400 is registered on the network using a unique identification number associated with each machine. In other networks, however, network access is associated with a subscriber or user of Application Specific Machine 400. Some specific Application Specific Machine 400 therefore require other subsystems 427 in order to support communications subsystem 440, and some application specific Application Specific Machine 400 further require application specific subsystems 427. Local or non-network communication functions, as well as some functions (if any) such as configuration, may be available, but Application Specific Machine 400 will be unable to carry out any other functions involving communications over the communications medium 480 unless it is provisioned. In the case of LTE, a SIM interface is normally provided and is similar to a card-slot into which a SIM card can be inserted and ejected like a persistent memory card, like an SD card. More generally, persistent Memory 420 can hold many key application specific persistent memory data or instructions 427, and other instructions x22 and data structures x25 such as identification, and subscriber related information. Although not expressly shown in the drawing, such instructions 422 and data structures 425 may be arranged in a class hierarchy so as to benefit from re-use whereby some instructions and data are at the class level of the hierarchy, and some instructions and data are at an object instance level of the hierarchy, as would be known to a person of ordinary skill in the art of object oriented programming and design.

When required network registration or activation procedures have been completed, Application Specific Machine 400 may send and receive communication signals over the communications medium 480. Signals received by receiver 446 through communications medium 480 may be subject to such common receiver functions as signal amplification, frequency down conversion, filtering, channel selection and the like, analog to digital (A/D) conversion. A/D conversion of a received signal allows more complex communication functions such as demodulation and decoding to be performed in the DSP 442. In a similar manner, signals to be transmitted are processed, including modulation and encoding for example, by DSP 442 and input to transmitter 444 for digital to analog conversion, frequency up conversion, filtering, amplification and transmission over the communication medium 480. DSP 442 not only processes communication signals, but also provides for receiver and transmitter control. For example, the gains applied to communication signals in receiver 446 and transmitter 444 may be adaptively controlled through automatic gain control algorithms implemented in DSP 444. In the example system shown in FIG. 17, application specific communications 447 are also provided. These include communication of information located in either persistent memory 420 or volatile memory 430, and in particular application specific PM Data or instructions 427 and application specific PM Data or instructions 437.

Communications medium 480 may further serve to communicate with multiple systems, including an other machine 490 and an application specific other machine 497, such as a server (not shown), GPS satellite (not shown) and other elements (not shown). For example, communications medium 480 may communicate with both cloud based systems and a web client based systems in order to accommodate various communications with various service levels. Other machine 490 and Application Specific Other machine 497 can be provided by another embodiment of Application Specific Machine 400, wherein the application specific portions are either configured to be specific to the application at the other machine 490 or the application specific other machine 497, as would be apparent by a person having ordinary skill in the art to which the other machine 490 and application specific other machine 497 pertains.

Application Specific Machine 400 preferably includes a processor 410 which controls the overall operation of the machine. Communication functions, including at least data communications, and where present, application specific communications 447, are performed through communication subsystem 440. Processor 410 also interacts with further machine subsystems such as the machine-human interface 460 including for example display 462, digitizer/buttons 464 (e.g. keyboard that can be provided with display 462 as a touch screen), speaker 465, microphone 466 and Application specific HMI 467. Processor 410 also interacts with the machine-machine interface 450 including for example auxiliary I/O 452, serial port 455 (such as a USB port, not shown), and application specific MHI 457. Processor 410 also interacts with persistent memory 420 (such as flash memory), volatile memory (such as random access memory (RAM)) 430. A short-range communications subsystem (not shown), and any other machine subsystems generally designated as Other subsystems 470, may be provided, including an application specific subsystem 427. In some embodiments, an application specific processor 417 is provided in order to process application specific data or instructions 427, 437, to communicate application specific communications 447, or to make use of application specific subsystems 427.

Some of the subsystems shown in FIG. 17 perform communication-related functions, whereas other subsystems may provide application specific or on-machine functions. Notably, some subsystems, such as digitizer/buttons 464 and display 462, for example, may be used for both communication-related functions, such as entering a text message for transmission over a communication network, and machine-resident functions such as application specific functions.

Operating system software used by the processor 410 is preferably stored in a persistent store such as persistent memory 420 (for example flash memory), which may instead be a read-only memory (ROM) or similar storage element (not shown). Those skilled in the art will appreciate that the operating system instructions 432 and data 435, application specific data or instructions 437, or parts thereof, may be temporarily loaded into a volatile 430 memory (such as RAM). Received or transmitted communication signals may also be stored in volatile memory 430 or persistent memory 420. Further, one or more unique identifiers (not shown) are also preferably stored in read-only memory, such as persistent memory 420.

As shown, persistent memory 420 can be segregated into different areas for both computer instructions 422 and application specific PM instructions 427 as well as program data storage 425 and application specific PM data 427. These different storage types indicate that each program can allocate a portion of persistent memory 420 for their own data storage requirements. Processor 410 and when present application specific processor 417, in addition to its operating system functions, preferably enables execution of software applications on the Application Specific Machine 400. A predetermined set of applications that control basic operations, including at least data communication applications for example, will normally be installed on Application Specific Machine 400 during manufacturing. A preferred software application may be a specific application embodying aspects of the present application. Naturally, one or more memory stores would be available on the Application Specific Machine 400 to facilitate storage of application specific data items. Such specific application would preferably have the ability to send and receive data items, via the communications medium 480. In a preferred embodiment, the application specific data items are seamlessly integrated, synchronized and updated, via the communications medium 480, with the machine 410 user's corresponding data items stored or associated with an other machine 490 or an application specific other machine 497. Further applications may also be loaded onto the Application Specific Machine 400 through the communications subsystems 440, the machine-machine interface 450, or any other suitable subsystem 470, and installed by a user in the volatile memory 430 or preferably in the persistent memory 420 for execution by the processor 410. Such flexibility in application installation increases the functionality of the machine and may provide enhanced on-machine functions, communication-related functions, or both. For example, secure communication applications may enable electronic commerce functions and other such financial transactions to be performed using the Application Specific Machine 400.

In a data communication mode, a received signal such as a text message or web page download will be processed by the communication subsystem 440 and input to the processor 410, which preferably further processes the received signal for output to the machine-human interface 460, or alternatively to a machine-machine interface 450. A user of Application Specific Machine 400 may also compose data items such as messages for example, using the machine-human interface 460, which preferably includes a digitizer/buttons 464 that may be provided as on a touch screen, in conjunction with the display 462 and possibly a machine-machine interface 450. Such composed data items may then be transmitted over a communication network through the communication subsystem 440. Although not expressly show, a camera can be used as both a machine-machine interface 450 by capturing coded images such as QR codes and barcodes, or reading and recognizing images by machine vision, as well as a human-machine interface 460 for capturing a picture of a scene or a user.

For audio/video communications, overall operation of Application Specific Machine 400 is similar, except that received signals would preferably be output to a speaker 465 and display 462, and signals for transmission would be generated by a microphone 466 and camera (not shown). Alternative voice or audio I/O subsystems, such as a voice message recording subsystem, may also be implemented on Application Specific Machine 400. Although voice or audio signal output is preferably accomplished primarily through the speaker 465, display 462 and applications specific MHI 467 may also be used to provide other related information.

Serial port 455 in FIG. 17 would normally be implemented in a smart phone-type machine as a USB port for which communication or charging functionality with a user's desktop computer, car, or charger (not shown), may be desirable. Such a port 455 would enable a user to set preferences through an external machine or software application and would extend the capabilities of Application Specific Machine 400 by providing for information or software downloads to Application Specific Machine 400 other than through a communications medium 480. The alternate path may for example be used to load an encryption key onto the machine through a direct and thus reliable and trusted connection to thereby enable secure machine communication.

Communications subsystems 440, may include a short-range communications subsystem (not shown), as a further optional component which may provide for communication between Application Specific Machine 400 and different systems or machines, which need not necessarily be similar machines. For example, the other subsystems 470 may include a low energy, near field, or other short-range associated circuits and components or a Bluetooth™ communication module to provide for communication with similarly enabled systems and machines.

The exemplary machine of FIG. 17 is meant to be illustrative and other machines with more or fewer features than the above could equally be used for the present application. For example, one or all of the components of FIG. 17 can be implemented using virtualization whereby a virtual Application Specific Machine 400, Communications medium 480, Other machine 490 or Application Specific Other Machine 497 is provided by a virtual machine. Software executed on these virtual machines is separated from the underlying hardware resources. The host machine is the actual machine on which the virtualization takes place, and the guest machine is the virtual machine. The terms host and guest differentiate between software that runs on the physical machine versus the virtual machine, respectively. The virtualization can be full virtualization wherein the instructions of the guest or virtual machine execute unmodified on the host or physical machine, partial virtualization wherein the virtual machine operates on shared hardware resources in an isolated manner, to hardware-assisted virtualization whereby hardware resources on the host machine are provided to optimize the performance of the virtual machine. Although not expressly shown in the drawing, a hypervisor program can be used to provide firmware for the guest or virtual machine on the host or physical machine. It will be thus apparent to a person having ordinary skill in the art that components of FIG. 17 can be implemented in either hardware or software, depending on the specific application. For example, while testing and developing the Application Specific Machine 400 may be provided entirely using an emulator for the machine, for example a smartphone emulator running Android™ or iOS™. When deployed, real smartphones would be used.

Each component in FIG. 17 can be implemented using any one of a number of cloud computing providers such as Microsoft's Azure™, Amazon's Web Service™, Google's Cloud Computing, or an OpenStack based provider, by way of example only. Thus, as will be apparent to a person having ordinary skill in the relevant field of art, depending on whether the environment in which operate the components of FIG. 17, the Communications medium 480 can be the Internet, an IP based medium such as a virtual, wired, or wireless network, an interconnect back plane on a host machine serving as a back bone between virtual machines and/or other real machines, or a combination thereof. For example, in the case of the communications subsystems 440, the Transmitter 444, Receiver 446 and DSP 442 may be unnecessary if the application specific machine is provided as a virtual machine. Likewise, when the application is a server provided as a virtual machine, the machine-human interface 460 and machine-machine interface 450 may be provided by re-use of the resources of the corresponding host machine, if needed at all.

Having described the environment in which the specific techniques of the present application can operate, application specific aspects will be further described by way of example only.

Figure 18:
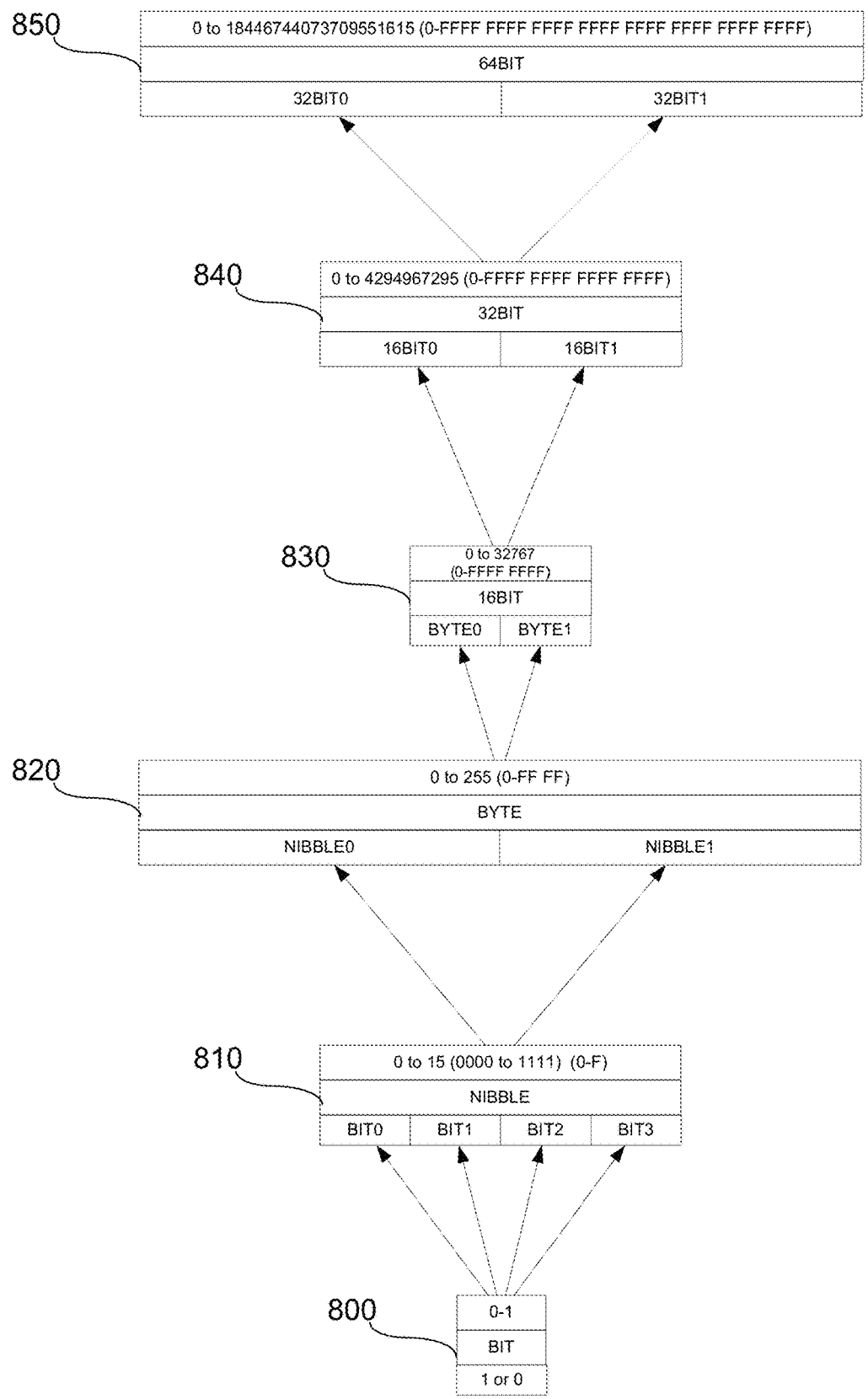
FIG. 18 is a block diagram of an exemplary collection of data representations for a bit, a nibble, a byte, a 16 bit, a 32 bit and a 64 bit values.

FIG. 18 is a block diagram of an exemplary collection of data representations for a bit, a nibble, a byte, a 16 bit, a 32 bit and a 64 bit values. A bit 800 is a binary data structure that can take on one of two values, typically represented by a 1 or a 0. In alternative physical realizations of a bit, the bit can be stored in read only memory, random access memory, storage medium, electromagnetic signals. Bits are typically realized in large multiples to represent vast amounts of data. A grouping four bits is called a nibble 810. Two nibbles form a bye 820. The byte 820 is of particular importance as most data structures that are larger groupings of bits than one byte are typically made up of multiples of bytes. Two bytes form 1 16 BIT 830 structure. Two 16 BIT structures form a 32 BIT 840 structure. Two 32 BIT structures form a 64 BIT 750 structure.

Figure 19:
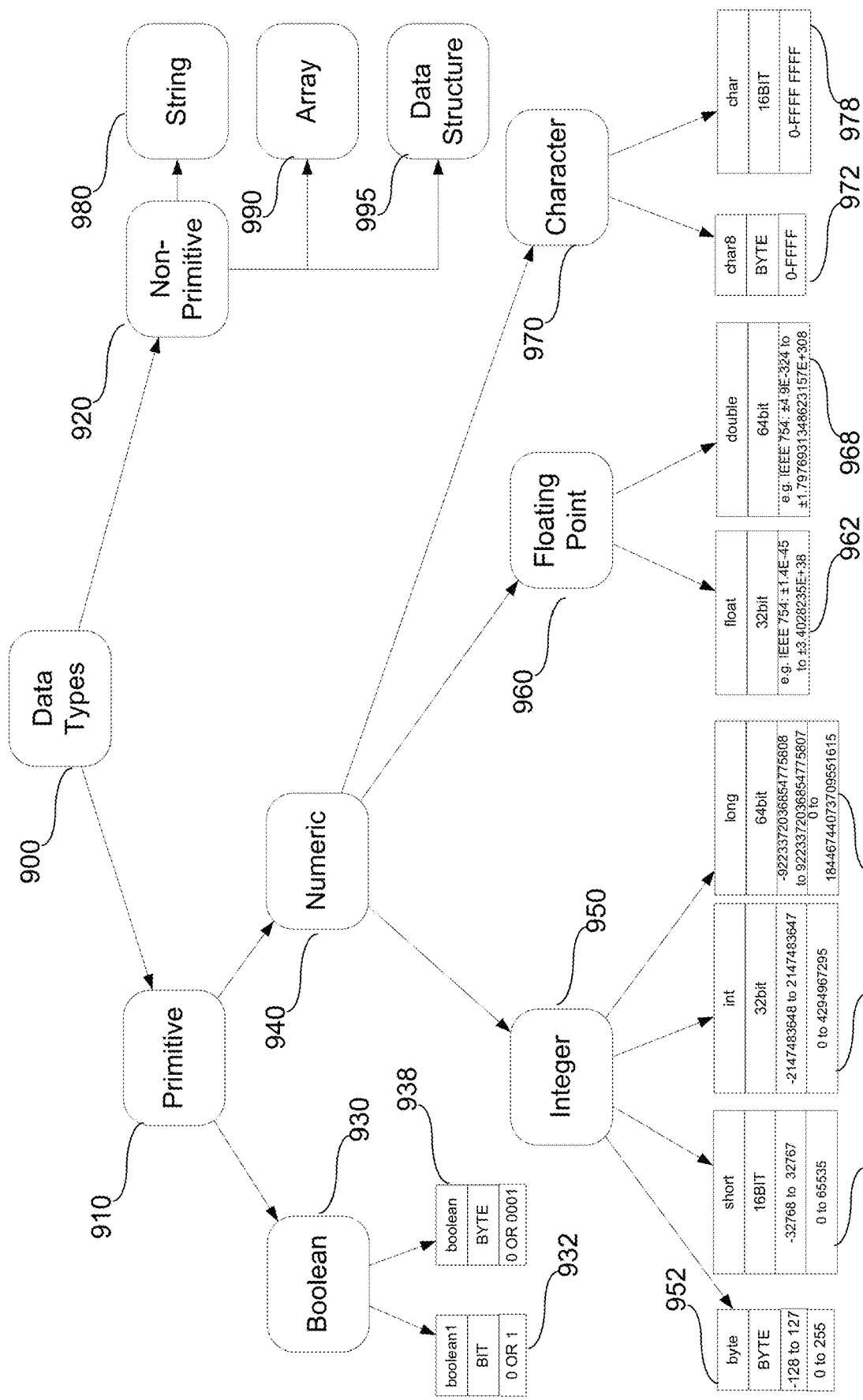
FIG. 19 is a block diagram of an exemplary collection of data types that uses the data representations of FIG. 18.

FIG. 19 is a block diagram of an exemplary collection of data types that uses the data representations of FIG. 18. Data types 900 are abstractions that represent application specific data using either primitive 910 or non-primitive constructs 920 The most fundamental primitive data type is a Boolean 930 data type, which can be represented using a single bit with the boolean1 932 data structure, or more frequently using a boolean 938 data structure that uses a single byte. More complex data types of the primitive data type is a Numeric 940 data type. Three broad examples of the Numeric 940 data type are the Integer 950 data type, the Floating Point 960 data type, and the Character 970 data types. A byte 952, a short 954, an int 956, and a long 958 are examples of Integer 950 Numeric 940 Primitive 910 Data Types 900 using a BYTE, 16 BIT, 16 BIT, 32 BIT and 64 BIT representation respectively. A float 962 and a double 968 are examples of Floating Point 960 Numeric 940 Primitive 910 Data Types and are represented using 32 BIT and 64 BIT representations respectively. Depending on the application, Integer 950 and Floating Point 960 Data Types 900 can be interpreted as signed or unsigned values. In contrast, Character 970 data types represent alphanumeric information. A char8 972 is represented using a single byte, while a char 978 is represented using a 16 BIT value, such as for example in ASCII or Unicode respectively. Having defined some example Primitive 910 Data Types 900, it is possible to build up Non-Primitive 920 Data Types 900 by combining Primitive 910 ones, such as for example a String 980 which is a collection of consecutive Character 970, an Array which is a collection of Primitive 910, and more generally, a Data Structure 995 which can be a collection of one or more Data Types 900.

Figure 20:
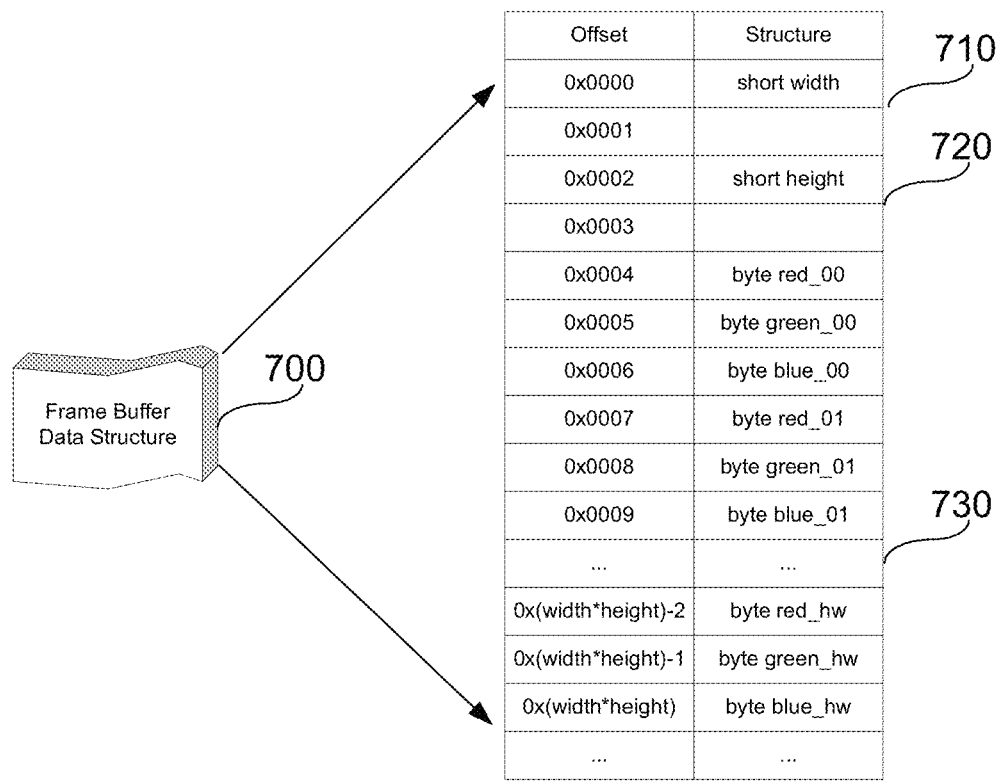
FIG. 20 is a block diagram of an exemplary frame buffer data structure that uses the data types of FIG. 19.

FIG. 20 is a block diagram of an exemplary frame buffer data structure that uses the data types of FIG. 19. The Frame Buffer Data Structure 700 includes unsigned short values for width 710 and height 720 in pixels (16 BIT or two bytes for each value), followed by red, green and blue byte (RGB) values 730 for each pixel red_ij, green_ij, blue_ij at location (i,j) in the frame, each value representing the intensity of red, green, and blue at the respective pixel. Although not shown in the drawing, in some embodiments, a fourth byte value can be used for each pixel, gamma_ij to represent transparency at location (i,j). The Frame Buffer Data Structure 700 represents an image, such as may be captured using a still or video camera, or such as may be displayed using each display of an AR eyewear, or such as may be communicated from a remote location to a local location, and vice versa. Other color models can be used, such as CMYK, other than RGB, but we prefer to use RGB as it is most convenient for camera capture and ar-eyewear display.

Figure 21:
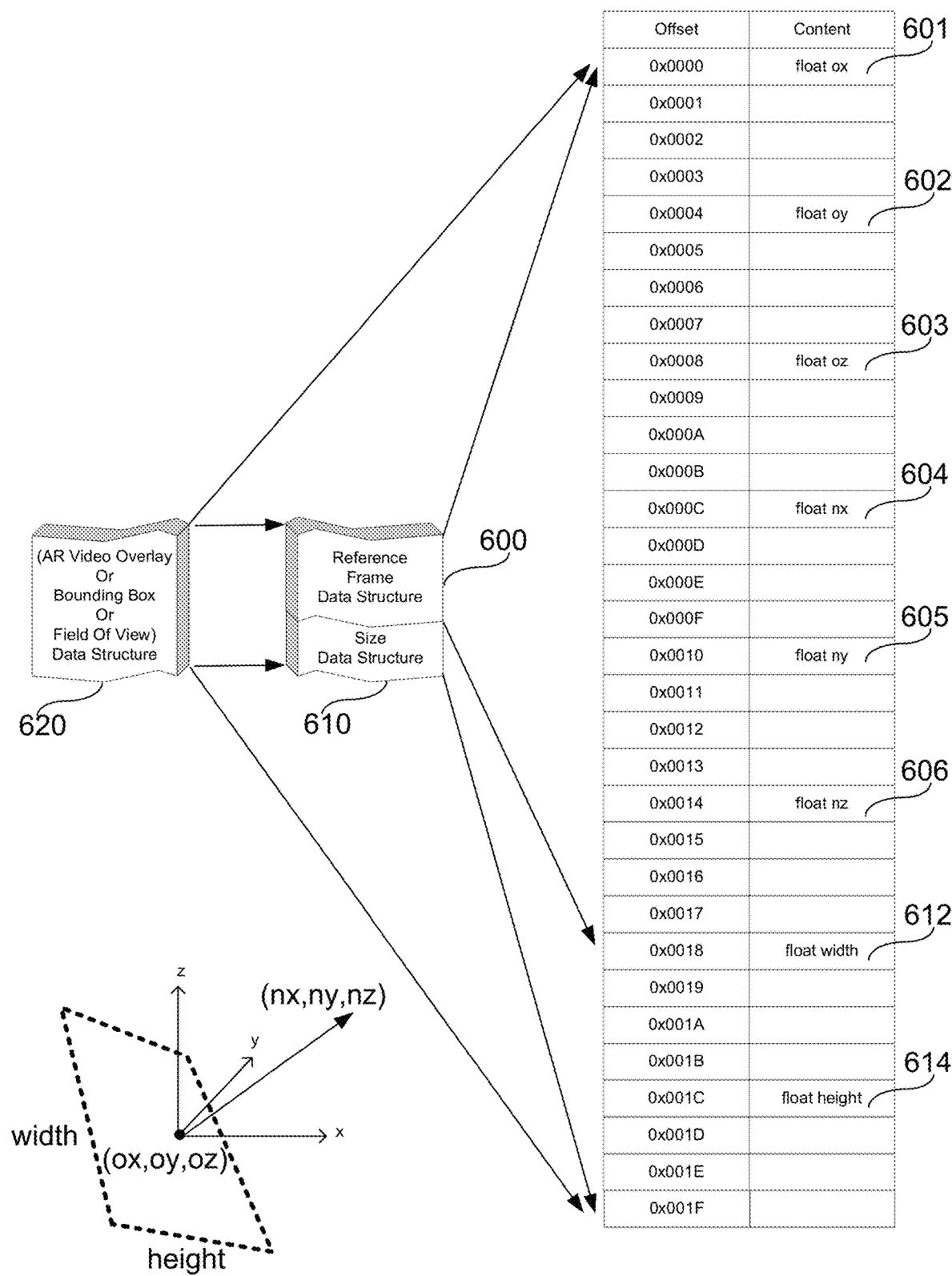
FIG. 21 is a block diagram of exemplary reference frame data structure, size data structure, ar-video overlay data structure, bounding box data structure, and field of view data structure that use the data types of FIG. 19.

FIG. 21 is a block diagram of exemplary reference frame data structure, size data structure, ar-video overlay data structure, bounding box data structure, and field of view data structure that use the data types of FIG. 19. A Reference Frame Data Structure 600 is illustrated containing an origin represented by float ox 601, float oy 602, float oz 603 and a normal vector float nx 604, float ny 605, float nz 606. A Size Data Structure 610 is also illustrated to specify the float width 612 and float height 614 of a rectangular area that is perpendicular to the normal vector. The origin can be, in alternative embodiments, at any one of the corners of the rectangular are specified, or in the middle of the rectangular area specified. When combined, the Reference Frame Data Structure 600 and Size Data Structure 610 can provide the AR Video Overlay, Bounding Box and Field Of View Data Structure 620.

Figure 22:
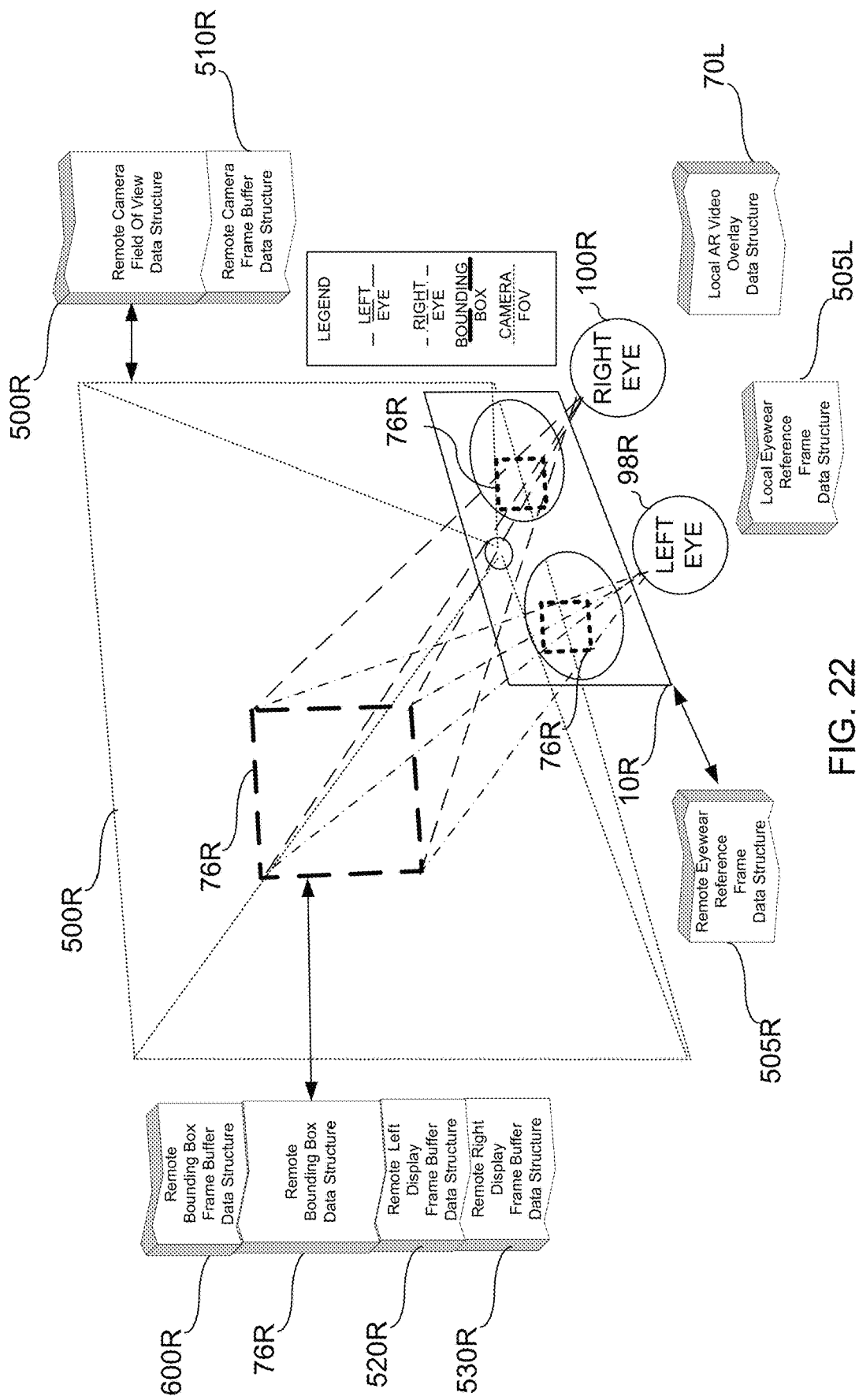
FIG. 22 illustrates the relationship between data structures in a remote location.

FIG. 22 illustrates the relationship between data structures in a remote location. A Remote AR Eyewear 10R is displaying a Remote Bounding Box Data Structure 76R to the left eye 98R and right eye 100R of a remote user by representing the Remote Bounding Box 76R on the Remote Left Display Frame Buffer 520R and Remote Right Display Frame Buffer 530R respectively. The Remote Camera Field Of View 500R is typically much larger than the Remote Bounding Box 76R such that, even if the Remote Eyewear Reference Frame 505R changes a little bit, the Remote Bounding Box 76R is still within the Remote Camera Field Of View 500R. From the perspective of the remote user, the Remote Bounding Box 76R appears to float in space at a fixed position, either entirely relative to the remote eyewear, or relative to a global space (e.g. using GPS coordinates). When using a global reference frame, one advantage is that the remote user can walk around the Remote Bounding Box 76R in order to orient the remote camera to provide a different point of view. When using a relative reference frame, one advantage is that the remote user can position the Remote Bounding Box 76R at a location that is either always in their peripheral vision, or in their central vision, depending on the application. Advantageously, at least the contents of the Remote Bounding Box Frame Buffer Data structure are sent to the local eyewear so that the local user can see what is visible to the remote user in the remote bonding box.

Figure 23:
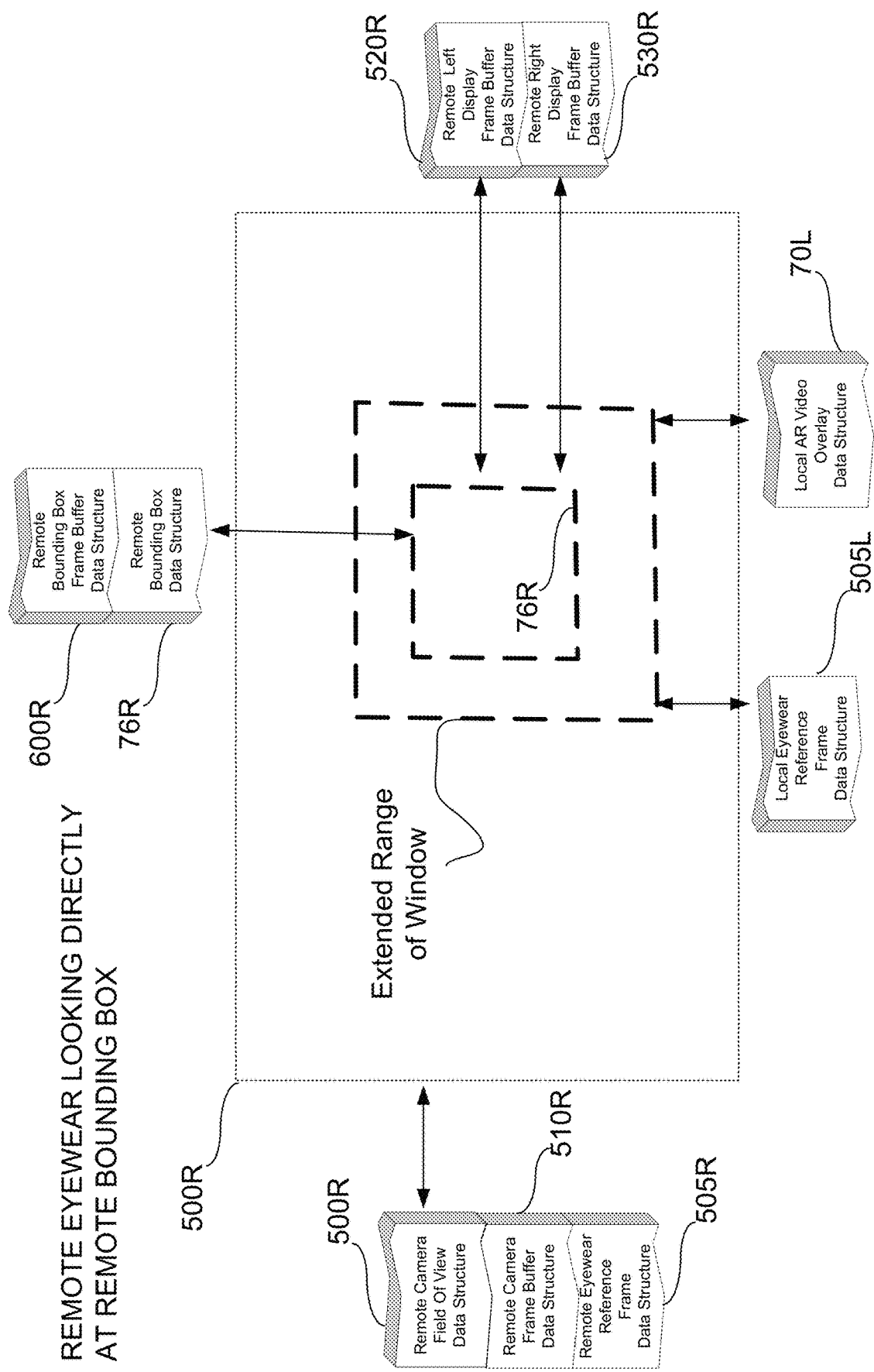
FIG. 23 illustrates the data structures involved in computing remote frame buffer data structures when the remote eyewear is looking directly at a remote bounding box.
Figure 24:
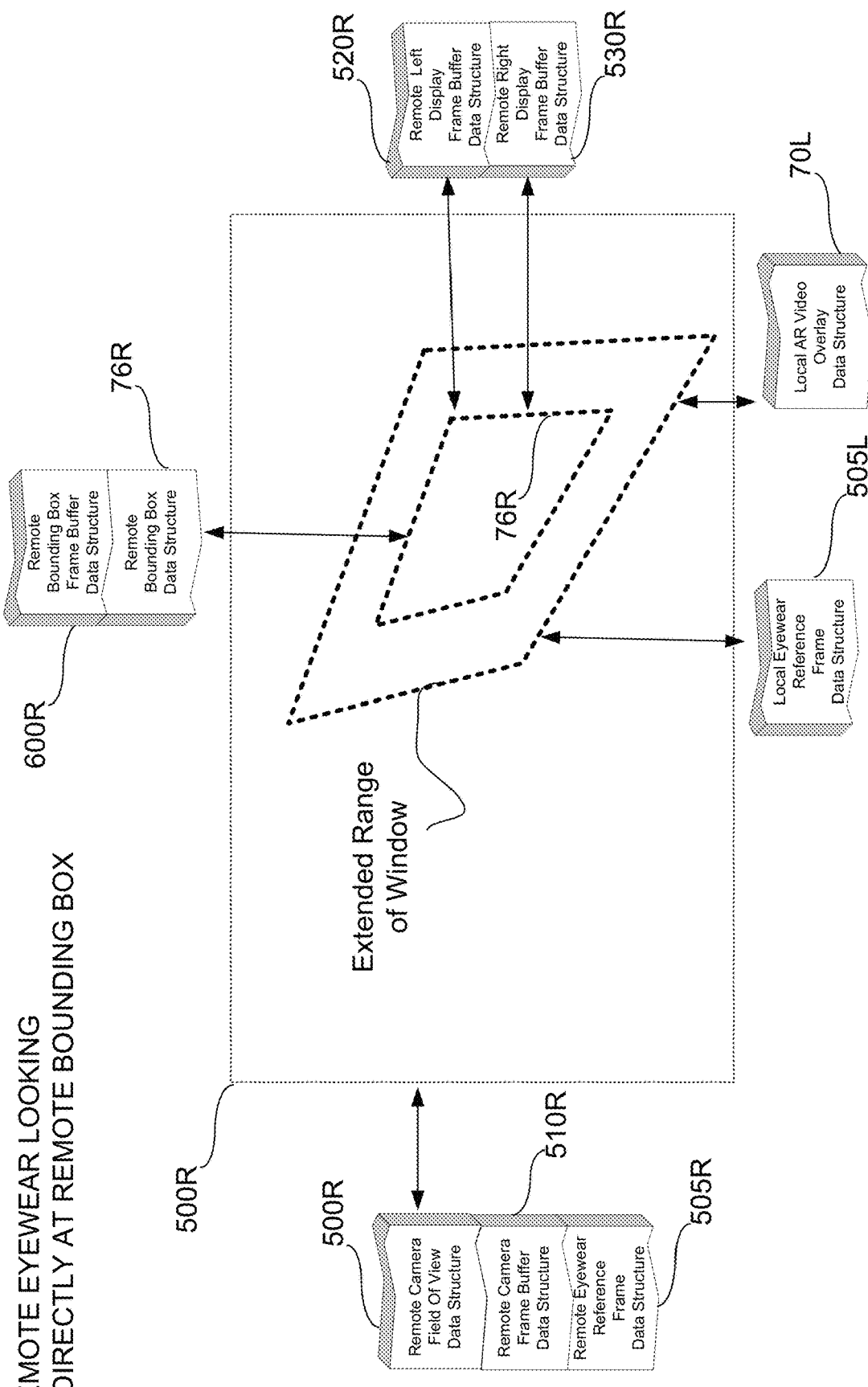
FIG. 24 illustrates the data structures involved in computing remote frame buffer data structures when the remote eyewear is looking indirectly at a remote bounding box.

FIG. 23 illustrates the data structures involved in computing remote frame buffer data structures when the remote eyewear is looking directly at a remote bounding box. A Remote Camera Field Of View 500R is illustrated along with its associated Remote Camera Frame Buffer Data Structure 510R that contains RGB data for the entire Remote Camera Field Of View 500R. By use of the Remote Eyewear Reference Frame Data Structure 505R, it is possible to interpret the Remote Camera Field Of View 500R to use global or relative coordinates, depending on the application. Regardless, the Remote Bounding Box Data Structure 76R is used to sample the Remote Camera Frame Buffer Data Structure 510R by interpolation resulting in a Remote Bounding Box Frame Buffer Data Structure 600R that can be sent to a local AR Eyewear user. In a preferred embodiment, the Remote Left Display Frame Buffer Data structure 520R and Remote Right Display Frame Buffer 530R are updated to show the Remote Bounding Box 76R to the remote AR Eyewear user. FIG. 24 illustrates the case where the Remote Bounding Box 76AR is at a relative reference frame such that when the AR Eyewear user changes orientation or direction, the Remote Bounding Box 76AR intersects the Remote Camera Field Of View 500R in substantially the same way regardless of the orientation of the Remote Eyewear Reference Frame 505R. Advantageously, at least the contents of the Remote Bounding Box Frame Buffer Data structure are sent to the local eyewear so that the local user can see what is visible to the remote user in the remote bonding box.

FIG. 24 illustrates the data structures involved in computing remote frame buffer data structures when the remote eyewear is looking indirectly at a remote bounding box. A Remote Camera Field Of View 500R is illustrated along with its associated Remote Camera Frame Buffer Data Structure 510R that contains RGB data for the entire Remote Camera Field Of View 500R. As with the previous case, although the user experience is different, the interpolation is performed in the same way: the Remote Bounding Box Data Structure 76R is used to sample the Remote Camera Frame Buffer Data Structure 510R by interpolation resulting in a Remote Bounding Box Frame Buffer Data Structure 600R that can be sent to a local AR Eyewear user. In a preferred embodiment, the Remote Left Display Frame Buffer Data structure 520R and Remote Right Display Frame Buffer 530R are updated to show the Remote Bounding Box 76R to the remote AR Eyewear user. Advantageously, at least the contents of the Remote Bounding Box Frame Buffer Data structure are sent to the local eyewear so that the local user can see what is visible to the remote user in the remote bonding box.

Figure 25:
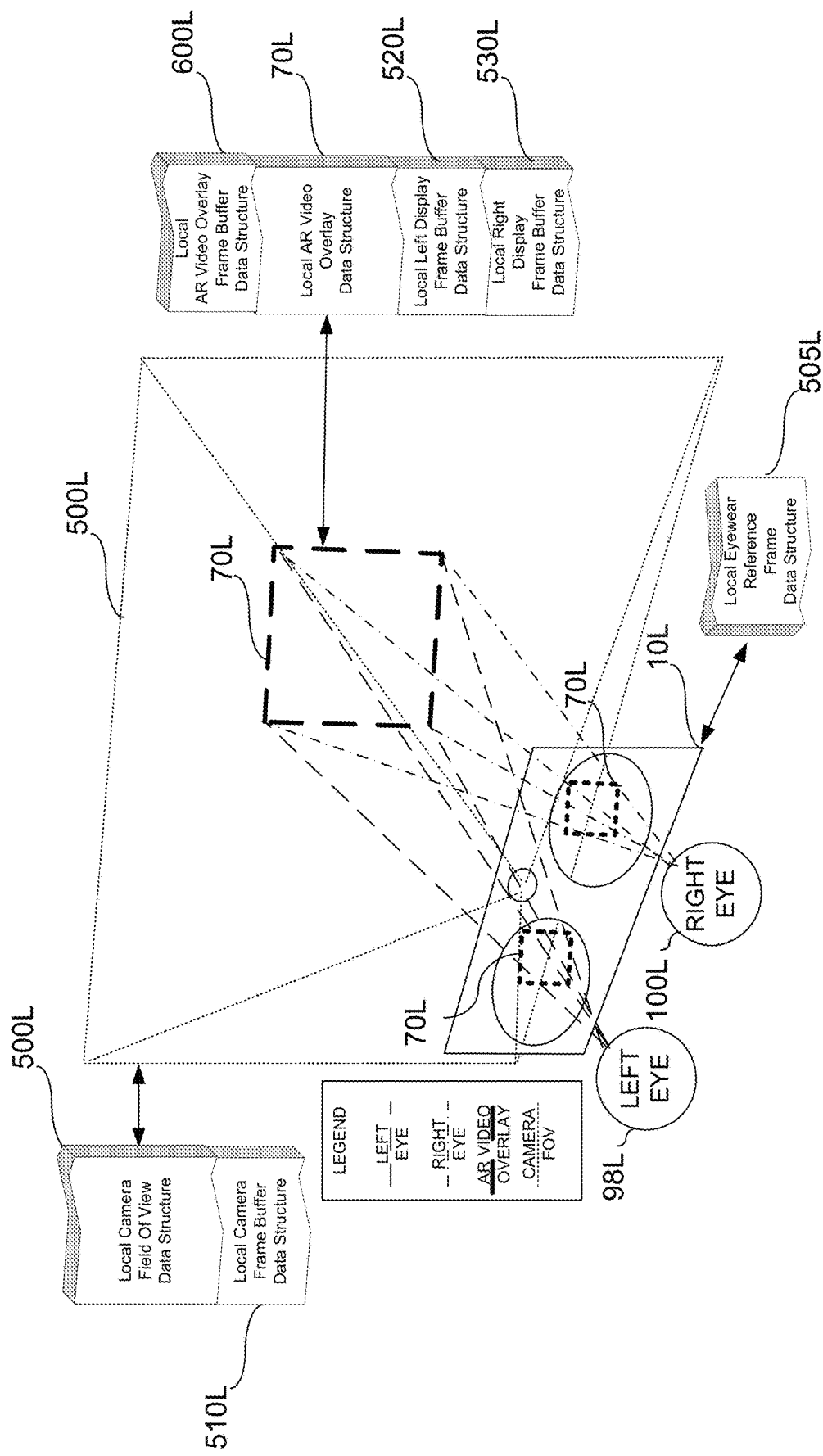
FIG. 25 illustrates the relationship between data structures in a local location.

FIG. 25 illustrates the relationship between data structures in a local location. Advantageously, at least the contents of the Remote Bounding Box Frame Buffer Data structure are received by the local eyewear so that the local user can see what is visible to the remote user in the remote bounding box. A Local AR Eyewear 10L is displaying a Local AR Video Overlay Data Structure 70L to the left eye 98R and right eye 100R of a local user by representing the Local AR Video Overlay 70L on the Local Left Display Frame Buffer 520L and Local Right Display Frame Buffer 530L respectively. Furthermore the content of the Local AR Video Overlay Buffer Data Structure 600 L is also displayed onto the Local Left Display Frame Buffer 520L and Local Right Display Frame Buffer 530L. The Local AR Video Overlay Buffer Data Structure 600L contains a copy of the remote Bounding Box Frame Buffer 600R communicated from the remote eyewear to the local eyewear. The Local Camera Field Of View 500L is typically much larger than the Local AR Video Overlay 70L such that, even if the Local Eyewear Reference Frame 505L changes a little bit, the Local AR Video Overlay 70L is still within the Local Camera Field Of View 500L thereby ensuring that the local AR Eyewear can continue to use the local camera to recognize the environment to display if necessary to display the Local AR Video Overlay 70L at a specified location either relative to the local Eyewear or at a global location. From the perspective of the local user, in alternative embodiments, the Local AR Viceo Overlay 70L, and the image from the remote location, appears to float in space at a position, that is either relative to the local eyewear, or relative to a global space (e.g. using GPS coordinates). When using a global reference frame, one advantage is that the local user can walk around the Local AR Video Overlay 70L in order to further direct the remote camera to provide a slightly different point of view, in a manner similar to how a person can see more or less of what is on the other side of a window, when changing position relative to a window. When using a relative reference frame, one advantage is that the local user can position the Local AR Video Overlay 76R at a location that is either always in their peripheral vision, or in their central vision, depending on the application.

Figure 26:
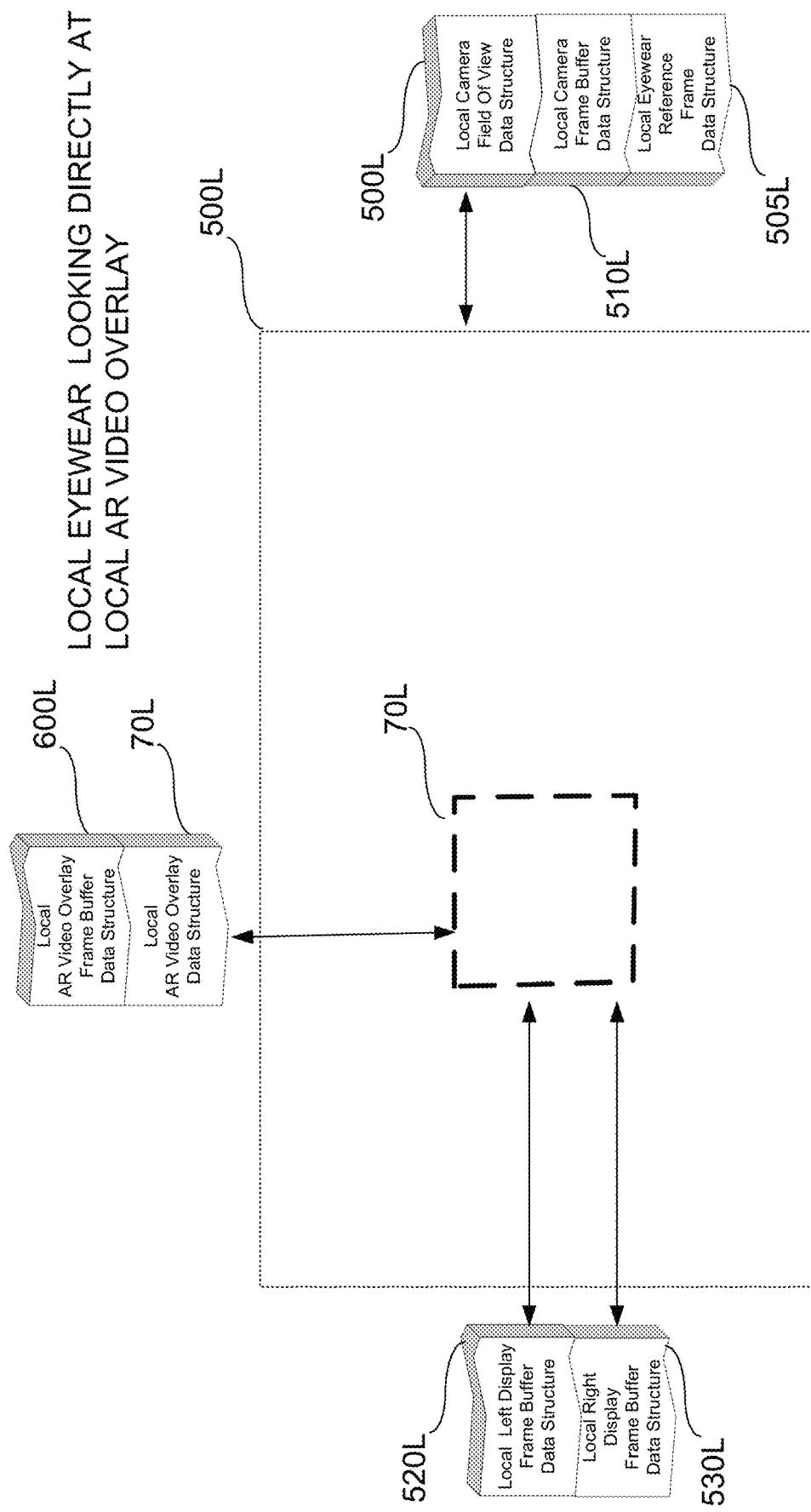
FIG. 26 illustrates the data structures involved in computing local frame buffer data structures when the local eyewear is looking directly at a local ar video overlay.

FIG. 26 illustrates the data structures involved in computing local frame buffer data structures when the local eyewear is looking directly at a local ar video overlay. Advantageously, at least the contents of the Remote Bounding Box Frame Buffer Data structure are received at the local eyewear so that the local user can see what is visible to the remote user in the remote bounding box.

Figure 27:
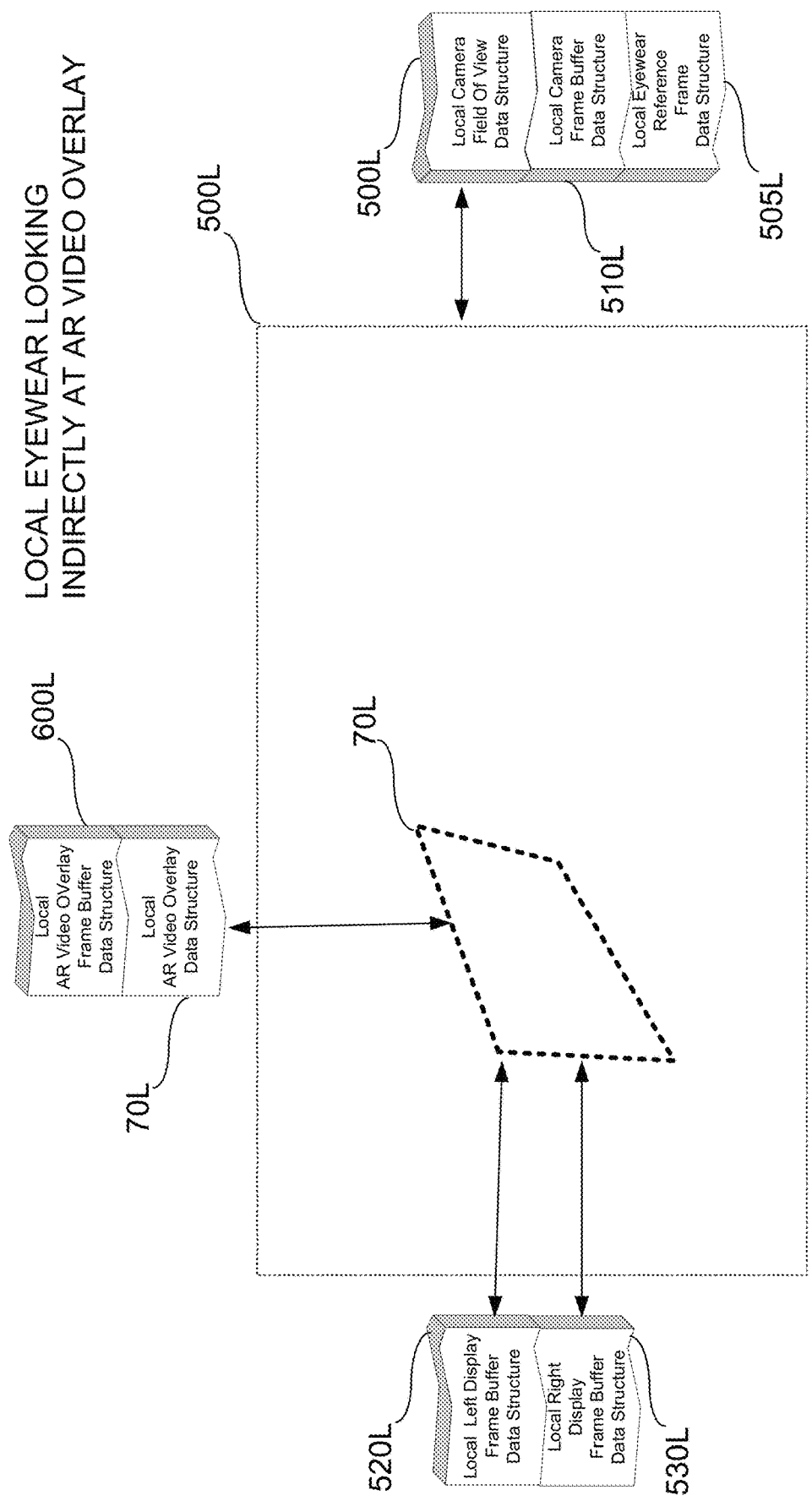
FIG. 27 illustrates the data structures involved in computing local frame buffer data structures when the local eyewear is looking indirectly at a local ar video overlay.

FIG. 27 illustrates the data structures involved in computing local frame buffer data structures when the local eyewear is looking indirectly at a local ar video overlay. Advantageously, at least the contents of the Remote Bounding Box Frame Buffer Data structure are received at the local eyewear so that the local user can see what is visible to the remote user in the remote bonding box. Furthermore, in some embodiments, the Local Eyewear Reference Frame 505L and/or the Local AR Video Overlay 70L are sent to the remote eyewear so that the local user, by moving around in real space, can affect the orientation of the portion of the remote camera field of view that is interpolated, e.g. by moving the local eyewear left, right, up or down, relative to the local ar video overlay, it is as if the remote bounding box 76R were displaced to the right, left, down or up respectively giving the local user the impression that they are looking through a window. It is envisaged that multiple cameras may be provided at one ar system. and that a single non-stereoscopic display can be provided at another ar system.

Although in the examples of FIGS. 22 to 27 the local eyewear was used to display video obtained from the camera of the remote eyewear, it is envisaged that the remote eyewear can also be used to display video obtained from the camera of the local eyewear. It is also envisaged to use the local eyewear to display video obtained from a remote camera that is not on a remote eyewear. It is also envisaged to pad frame buffer data with cached image data in the event of a frame buffer interpolation that exceeds the limits of the camera frame buffer.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Since other modifications and changes varied to fit particular operating requirements and environments will be apparent to those skilled in the art, the application is not considered limited to the example chosen for purposes of disclosure, and covers all changes and modifications which do not constitute departures from the true spirit and scope of this application.

What is claimed is:

1. A method of augmented reality communications between a first system having at least one camera with a first field of view and a second system having at least one display with a second field of view, the first and second systems being in data communication with each other, the method comprising the steps of:
   a. providing a camera field of view data structure at the first system corresponding to the field of view of the at least one camera;
   b. providing a camera frame buffer data structure at the first system for receiving image data from the camera corresponding to what is visible in the field of view of the camera;
   c. providing a bounding box data structure at the first system corresponding to a desired portion of the camera field of view;
   d. providing a bounding box frame buffer data structure at the first system for receiving a portion of the image data in the camera frame buffer data structure;
   e. interpolating between the bounding box data structure and the camera field of view data structure to copy a portion of the camera frame buffer data structure into the bounding box frame buffer data structure; and
   f. sending the bounding box frame buffer data structure from the first system to the second system.

2. The method of claim 1, further comprising the step of:
   a. receiving at least one data structure at the first system from the second system; and
   b. using the at least one data structure received at the first system to shift the portion of the camera frame buffer that is used in the interpolating step thereby enabling the second system to use another portion of the camera frame buffer data structure.

3. The method of claim 2, wherein the at least one data structure includes a reference frame data structure of the second system.

4. The method of claim 2, wherein the at least one data structure includes an augmented reality (ar) video overlay data structure of the second system.

5. The method of claim 1, further comprising the steps of:
   a. providing at least one display at the first system;
   b. providing at least one display field of view data structure corresponding to the field of view of a display at the first system;
   c. providing at least one display frame buffer data structure at the first system for receiving image data to be displayed in the field of view of the at least one display;
   d. displaying the display frame buffer data structure on the at least one display.

6. The method of claim 5, further comprising the step of representing the bounding box data structure in the at least one display frame buffer so that the bounding box is visible in the at least one display.

7. The method of claim 5 wherein the at least one display includes a left display and a right display, wherein the at least one display field of view data structure includes a left display field of view data structure and a right display field of view data structure, and wherein the at least one display frame buffer data structure includes a left display frame buffer data structure and a right display frame buffer data structure.

8. The method of claim 1 wherein the bounding box data structure coincides with the surface of a mirror.

9. A method of augmented reality communications between a first system having at least one camera with a first field of view and a second system having at least one display with a second field of view, the first and second systems being in data communication with each other, the method comprising the steps of:
 a. providing at least one display field of view data structure at the second system corresponding to the field of view of the at least one display;
 b. providing an augmented reality video overlay data structure at the second system corresponding to a desired portion of the at least one display field of view;
 c. receiving a bounding box frame buffer data structure from the first system at the second system;
 d. providing at least one display frame buffer data structure at the second system for receiving image to be displayed in a portion of the field of view of the at least one display;
 e. interpolating between the augmented reality video overlay data structure and the display field of view data structure to copy the received display frame buffer data structure to the at least one display buffer data structure; and
 f. displaying the at least one display buffer data structure on the at least one display.

10. The method of claim 9, further comprising the step of sending at least one data structure to the first system from the second system.

11. The method of claim 9, wherein the at least one data structure includes a reference frame data structure of the second system.

12. The method of claim 9, wherein the at least one data structure includes an augmented reality (ar) video overlay data structure of the second system.

13. The method of claim 9 wherein the augmented reality video overlay data structure coincides with the surface of a mirror.

* * * * *